US010728547B2

(12) United States Patent
Lee et al.

(10) Patent No.: US 10,728,547 B2
(45) Date of Patent: Jul. 28, 2020

(54) VIDEO ENCODING METHOD AND APPARATUS, AND VIDEO DECODING METHOD AND APPARATUS, FOR SIGNALING SAO PARAMETER

(71) Applicant: SAMSUNG ELECTRONICS CO., LTD., Suwon-si (KR)

(72) Inventors: Sun-il Lee, Seoul (KR); Elena Alshina, Suwon-si (KR); Yin-ji Piao, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 15/180,649

(22) Filed: Jun. 13, 2016

(65) Prior Publication Data

US 2016/0286213 A1 Sep. 29, 2016

Related U.S. Application Data

(63) Continuation of application No. PCT/KR2014/012288, filed on Dec. 12, 2014.
(Continued)

(51) Int. Cl.
*H04N 19/117* (2014.01)
*H04N 19/463* (2014.01)
(Continued)

(52) U.S. Cl.
CPC ......... *H04N 19/117* (2014.11); *H04N 19/176* (2014.11); *H04N 19/182* (2014.11);
(Continued)

(58) Field of Classification Search
CPC .. H04N 19/117; H04N 19/176; H04N 19/182; H04N 19/184; H04N 19/44; H04N 19/463
See application file for complete search history.

(56) References Cited

U.S. PATENT DOCUMENTS 9,380,320 B2 6/2016 Shen et al.
2012/0177103 A1 7/2012 Fu et al.
(Continued)

FOREIGN PATENT DOCUMENTS

CN 103220510 A 7/2013
EP 2627087 A1 8/2013
(Continued)

OTHER PUBLICATIONS

Communication dated Feb. 24, 2015 issued by the International Searching Authority in counterpart International Application No. PCT/KR2014/012288 (PCT/ISA/210 & PCT/ISA/237).
(Continued)

*Primary Examiner* — Mohammed S Rahaman
(74) *Attorney, Agent, or Firm* — Sughrue Mion, PLLC

(57) ABSTRACT

Provided is a video decoding method for signaling of sample adaptive offset (SAO) parameters, the video decoding method including obtaining, from a bitstream, position information of each of a plurality of bandgroups with respect to a current block comprised in a video; obtaining, from the bitstream, offsets with respect to bands comprised in each of the plurality of bandgroups; determining the plurality of bandgroups so as to compensate for a pixel sample value of the current block, based on the position information of each of the plurality of bandgroups; and compensating for a sample value of a reconstructed pixel comprised in the current block, by using the obtained offsets. In this regard, each of the plurality of determined bandgroups comprises at least one band.

4 Claims, 28 Drawing Sheets

Related U.S. Application Data

(60) Provisional application No. 61/915,254, filed on Dec. 12, 2013.

(51) Int. Cl.
*H04N 19/44* (2014.01)
*H04N 19/176* (2014.01)
*H04N 19/182* (2014.01)
*H04N 19/184* (2014.01)

(52) U.S. Cl.
CPC ........... *H04N 19/184* (2014.11); *H04N 19/44* (2014.11); *H04N 19/463* (2014.11)

(56) References Cited

U.S. PATENT DOCUMENTS

| | | | |
|---|---|---|---|
| 2013/0051454 A1 | 2/2013 | Sze et al. | |
| 2013/0114674 A1* | 5/2013 | Chong | H04N 19/86 375/240.02 |
| 2013/0114678 A1* | 5/2013 | Baylon | H04N 19/176 375/240.02 |
| 2013/0188737 A1* | 7/2013 | Maani | H04N 19/176 375/240.25 |
| 2013/0188741 A1* | 7/2013 | Minoo | H04N 19/86 375/240.26 |
| 2013/0208788 A1* | 8/2013 | Chen | H04N 19/82 375/240.02 |
| 2014/0119433 A1* | 5/2014 | Park | H04N 19/44 375/240.02 |
| 2014/0185665 A1* | 7/2014 | Pu | H04N 19/117 375/240.02 |
| 2016/0119636 A1 | 4/2016 | Maani et al. | |
| 2018/0234692 A1 | 8/2018 | Maani et al. | |

FOREIGN PATENT DOCUMENTS

| | | |
|---|---|---|
| EP | 3288266 A1 | 2/2018 |
| KR | 10-2013-0085966 A | 7/2013 |
| TW | 201338556 A | 9/2013 |
| WO | 2012176964 A1 | 12/2012 |

OTHER PUBLICATIONS

Chih-Ming Fu, et al; "CE8 Subset3: Picture Quadtree Adaptive Offset"; Joint Collaborative Team on Video Coding (JCT-VC) of ITU-T SG16 WP3 and ISO/IEC JTC1/SC29/WG11; Document: JCTVC-D122; Jan. 20-28, 2011; pp. 1-10.

Guillaume Laroche, et al; "On additional SAO Band Offset classifications"; Joint Collaborative Team on Video Coding (JCT-VC) of ITU-T SG16 WP3 and ISO/IEC JTC1/SC29/WG11; Document : JCTVC-G246; Nov. 21-30, 2011; pp. 1-7.

Communication dated Aug. 3, 2018, issued by the State Intellectual Property Office of the People's Republic of China in counterpart Chinese Patent Application No. 201480075345.1.

Communication dated Mar. 8, 2019, from the State Intellectual Property Office of People's Republic of China in counterpart Application No. 201480075345.1.

Communication dated Jun. 28, 2019, issued by the Chinese Patent Office in counterpart Chinese Application No. 201480075345.1.

* cited by examiner

PARTITION MODE (800)

PREDICTION MODE (810)

SIZE OF TRANSFORMATION UNIT (820)

CODING UNIT (1010)

VIDEO ENCODING METHOD AND APPARATUS, AND VIDEO DECODING METHOD AND APPARATUS, FOR SIGNALING SAO PARAMETER

TECHNICAL FIELD

The present disclosure relates to a video encoding method and apparatus and video decoding method and apparatus for signaling of sample adaptive offset (SAO) parameters.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a coding unit having a predetermined size.

Image data of a spatial domain is transformed into coefficients of a frequency domain via frequency transformation. According to a video codec, an image is split into blocks having a predetermined size, discrete cosine transformation (DCT) is performed on each block, and frequency coefficients are encoded in block units, for rapid calculation of frequency transformation. Compared to image data of the spatial domain, coefficients of the frequency domain are easily compressed. In particular, since an image pixel value of the spatial domain is expressed according to a prediction error via inter prediction or intra prediction of the video codec, when frequency transformation is performed on the prediction error, a large amount of data may be transformed to 0. According to the video codec, an amount of data may be reduced by replacing data that is consecutively and repeatedly generated with small-sized data.

In particular, a method of adjusting a value of a reconstructed pixel as much as a sample adaptive offset (SAO) may be employed during an operation of encoding and decoding video so as to minimize an error between an original image and a reconstructed image.

DETAILED DESCRIPTION OF THE INVENTION

Technical Problem

According to an aspect of the present disclosure, there is provided a video encoding method for signaling of sample adaptive offset (SAO) parameters, the video encoding method including determining a plurality of bandgroups to compensate for a pixel sample value of a current block comprised in a video; determining bandgroup position information indicating a position of each of the plurality of determined bandgroups; determining offsets with respect to bands comprised in each of the plurality of determined bandgroups; and generating a bitstream comprising the determined bandgroup position information, the determined offsets, and an encoded video, wherein each of the plurality of determined bandgroups comprises at least one band.

According to another aspect of the present disclosure, there is provided a video decoding method for signaling of sample adaptive offset (SAO) parameters, the video decoding method including obtaining, from a bitstream, position information of each of a plurality of bandgroups with respect to a current block comprised in a video; obtaining, from the bitstream, offsets with respect to bands comprised in each of the plurality of bandgroups; determining the plurality of bandgroups to compensate for a pixel sample value of the current block, based on the position information of each of the plurality of bandgroups; and compensating for a sample value of a reconstructed pixel comprised in the current block, by using the obtained offsets, wherein each of the plurality of determined bandgroups comprises at least one band.

Advantageous Effects of the Invention

According to various embodiments, compression efficiency may be improved by using video encoding and decoding methods of signaling a sample adaptive offset (SAO) parameter.

In more detail, bandgroup position information of each of a plurality of bandgroups, and offset value information of each of bands included in each of the bandgroups are signaled, so that distortion between an original image and a reconstructed image may be efficiently decreased, and performance deterioration due to an increase in a signalling overhead may be prevented.

BEST MODE

Figure 1A:
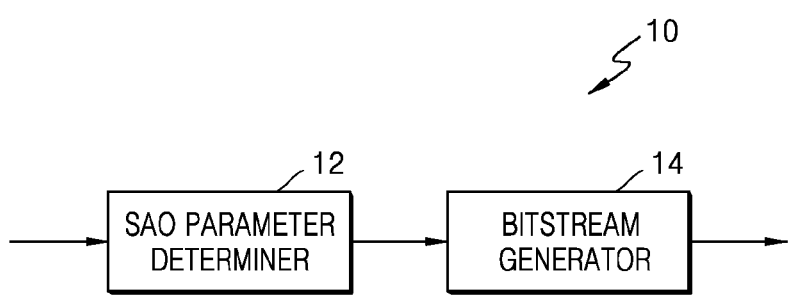
FIGS. 1A and 1B, respectively, show a block diagram of a sample adaptive offset (SAO) encoding apparatus and a flowchart of an SAO encoding method, according to an embodiment of the present disclosure.

According to an aspect of the present disclosure, there is provided a video encoding method for signaling of sample adaptive offset (SAO) parameters, the video encoding method including determining a plurality of bandgroups to compensate for a pixel sample value of a current block comprised in a video; determining bandgroup position information indicating a position of each of the plurality of determined bandgroups; determining offsets with respect to bands comprised in each of the plurality of determined bandgroups; and generating a bitstream comprising the determined bandgroup position information, the determined offsets, and an encoded video, wherein each of the plurality of determined bandgroups comprises at least one band.

The determined bandgroup position information may include information indicating a position of a start band comprised in each of the plurality of determined bandgroups.

The plurality of determined bandgroups may include two bandgroups. Also, each of the plurality of determined bandgroups may include two bands.

The current block may be a largest coding unit (LCU) comprised in the video.

Each of the plurality of determined bandgroups may include at least two adjacent bands.

According to another aspect of the present disclosure, there is provided a video decoding method for signaling of sample adaptive offset (SAO) parameters, the video decoding method including obtaining, from a bitstream, position information of each of a plurality of bandgroups with respect to a current block comprised in a video; obtaining, from the bitstream, offsets with respect to bands comprised in each of the plurality of bandgroups; determining the plurality of bandgroups to compensate for a pixel sample value of the current block, based on the position information of each of the plurality of bandgroups; and compensating for a sample value of a reconstructed pixel comprised in the current block, by using the obtained offsets, wherein each of the plurality of determined bandgroups comprises at least one band.

The position information of each of the plurality of determined bandgroups may include information indicating a position of a start band comprised in each of the plurality of bandgroups.

The plurality of determined bandgroups may include two bandgroups. Also, each of the plurality of determined bandgroups may include two bands.

The current block may be a largest coding unit (LCU) comprised in the video.

Each of the plurality of determined bandgroups may include at least two adjacent bands.

An offset of a band except for the plurality of determined bandgroups, the band being from among all bands, may be initialized as 0.

The plurality of determined bandgroups may not be consecutive.

According to another aspect of the present disclosure, there is provided a video encoding apparatus including a sample adaptive offset (SAO) parameter determiner configured to determine a plurality of bandgroups to compensate for a pixel sample value of a current block comprised in a video, to determine bandgroup position information indicating a position of each of the plurality of determined bandgroups, and to determine offsets with respect to bands comprised in each of the plurality of determined bandgroups; and a bitstream generator configured to generate a bitstream comprising the determined bandgroup position information, the determined offsets, and an encoded video, wherein each of the plurality of determined bandgroups comprises at least one band.

According to another aspect of the present disclosure, there is provided a video decoding apparatus including a receiver configured to obtain, from a bitstream, position information of each of a plurality of bandgroups with respect to a current block comprised in a video, and to obtain, from the bitstream, offsets with respect to bands comprised in each of the plurality of bandgroups; a sample adaptive offset (SAO) parameter determiner configured to determine the plurality of bandgroups so as to compensate for a pixel sample value of the current block, based on the position information of each of the plurality of bandgroups; and a sample compensator configured to compensate for a sample value of a reconstructed pixel comprised in the current block, by using the obtained offsets, wherein each of the plurality of determined bandgroups comprises at least one band.

According to another aspect of the present disclosure, there is provided a computer-readable recording medium having recorded thereon a program for executing, by using a computer, encoding and decoding methods for signaling of SAO parameters.

MODE OF THE INVENTION

Hereinafter, a method of manufacturing and using the present disclosure is described in detail. As used herein, terms such as "unit" and "module" indicate a unit for processing at least one function or operation, wherein the unit and the module may be embodied as hardware or software or may be embodied by combining hardware and software.

As used herein, the term "an embodiment" or "embodiments" of the present disclosure refers to properties, structures, features, and the like, that are described in relation to an embodiment that is included in at least one embodiment of the present disclosure. Thus, expressions such as "according to an embodiment" do not always refer to the same embodiment.

First, a video encoding method and video decoding method for signaling of sample adaptive offset (SAO) parameters according to an embodiment will be described with reference to FIGS. 1 through 6.

Furthermore, embodiments in which SAO adjustment based on pixel classification in video encoding operations and video decoding operations based on coding units of a tree structure is used will be described with reference to FIGS. 7 through 26. Hereinafter, an 'image' may denote a still image or a moving image of a video, or a video itself.

First, a video encoding method and video decoding method for signaling of sample adaptive offset (SAO) parameters will be described with reference to FIGS. 1 through 6. Samples are signalled between a SAO encoding apparatus 10 and a SAO decoding apparatus 20. That is, the SAO encoding apparatus 10 may encode samples generated by encoding video, may include the encoded samples in a bitstream, and may transmit the bitstream including the encoded samples. The SAO decoding apparatus 20 may parse and reconstruct the samples from the received bitstream.

In order to minimize an error between original pixels and reconstructed pixels by adjusting pixel values of the reconstructed pixels by an offset determined according to pixel classification, the SAO encoding apparatus 10 and the SAO decoding apparatus 20 according to an embodiment of the present disclosure signal SAO parameters for the SAO adjustment. The offset, as the SAO parameters, is encoded and then is transmitted by the SAO encoding apparatus 10, and the SAO decoding apparatus 20 receives the encoded and transmitted offset, and decodes the received offset. Thus, the SAO decoding apparatus 20 according to an embodiment of the present disclosure may generate a reconstructed image having a minimized error between an original image and the reconstructed image by decoding a received bitstream, generating reconstructed pixels of each of image blocks, reconstructing offset values from the bitstream, and adjusting the reconstructed pixels by the offset values.

An operation of the SAO encoding apparatus 10 that performs SAO adjustment will now be described with reference to FIGS. 1A and 1B, and an operation of the SAO decoding apparatus 20 that performs SAO adjustment will now be described with reference to FIGS. 2A and 2B.

Figure 1B:
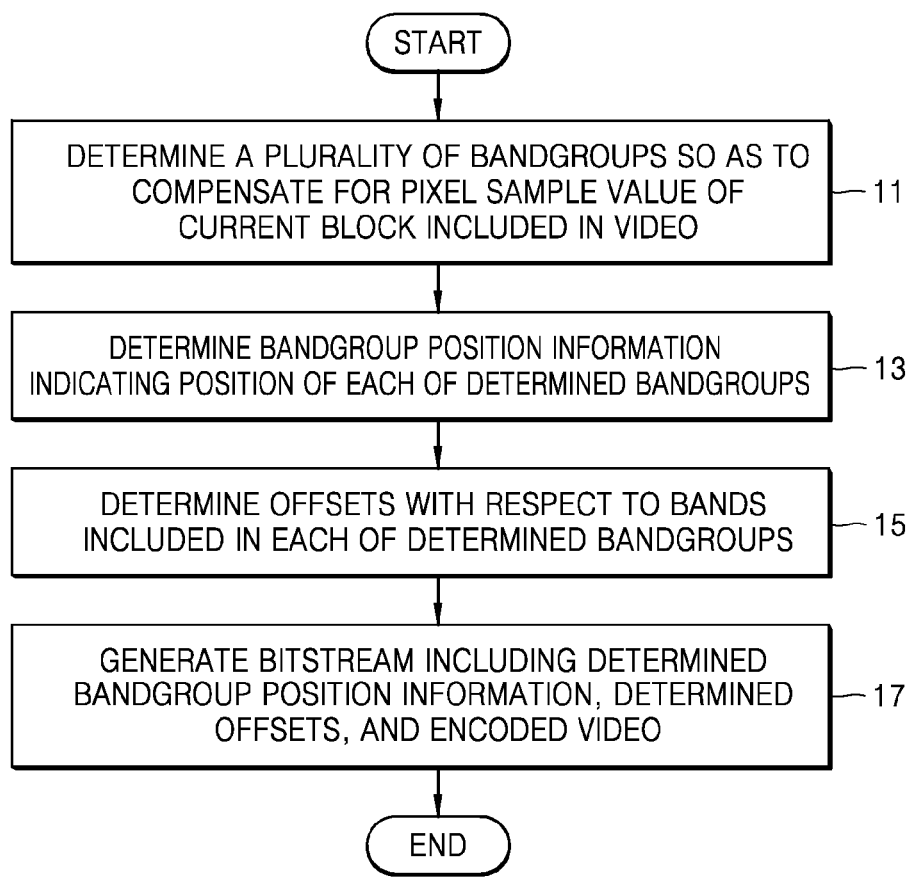

FIGS. 1A and 1B respectively show a block diagram of the SAO encoding apparatus 10 and a flowchart of an encoding method using prediction of a SAO parameter, according to an embodiment.

The SAO encoding apparatus 10 according to an embodiment includes a SAO parameter determiner 12 and a bitstream generator 14. The SAO encoding apparatus 10 according to an embodiment receives an input of images such as slices of a video, splits each image into blocks, and encodes each block. A block may have a square shape, a rectangular shape, or an arbitrary geometrical shape, and is not limited to a data unit having a predetermined size. The block according to an embodiment may be a largest coding unit (LCU), a coding unit (CU), a prediction unit or a transformation unit among coding units according to a tree structure. Video encoding and decoding methods based on coding units according to a tree structure will be described below with reference to FIGS. 7 through 26.

The SAO encoding apparatus 10 according to an embodiment may split each input image into LCUs, and may output resultant data generated by performing prediction, transformation, and entropy encoding on samples of each LCU, as a bitstream. Samples of an LCU may be pixel value data of pixels included in the LCU.

The SAO encoding apparatus 10 according to an embodiment may individually encode LCUs of an image. For example, the SAO encoding apparatus 10 may encode a current LCU based on coding units split from the current LCU and having a tree structure.

In order to encode the current LCU, the SAO encoding apparatus 10 may encode samples by performing intra prediction, inter prediction, transformation, and quantization on each of coding units included in the current LCU and having a tree structure.

Then, the SAO encoding apparatus 10 may reconstruct the encoded samples included in the current LCU by performing inverse-quantization, inverse-transformation, intra prediction or motion compensation on each of the coding units having a tree structure.

In addition, the SAO encoding apparatus 10 may perform de-blocking on the reconstructed samples in the LCU so as to reduce image deterioration in block boundaries, and may apply an SAO to the LCU, on which de-blocking is performed, so as to minimize an error between original pixels and reconstructed pixels. Here, the SAO encoding apparatus 10 may determine one SAO type from among an edge type and a band type, and may apply the SAO according to the determined SAO type.

However, if the SAO encoding apparatus 10 determines the band type from among SAO types, the SAO encoding apparatus 10 may determine an offset value for each of bands to which the SAO is applied. For example, the SAO encoding apparatus 10 may determine offset values of all bands, and may transmit a bitstream including the offset values of all bands. Here, the band means a range of a sample value to which a particular offset value is applied, and since the band means an interval by which the particular offset value is applied, the band may be referred to as the interval. Equally, the band type may also be referred to as an interval type.

In this case, the SAO encoding apparatus 10 does not perform a process of determining some bands from among all bands which are optimal for applying the SAO, thus, the amount of calculation is decreased.

However, since the SAO encoding apparatus 10 transmits the offset values of all bands, a signalling overhead is increased, thus, in order to prevent an excessive increase in the signalling overhead, there is a limit in increasing the number of all bands.

As another example, the SAO encoding apparatus 10 may determine a bandgroup including some bands to which the SAO is applied, some bands being from among all bands. However, the name of the bandgroup is not limited thereto, and thus the bandgroup may also be referred to as an interval group.

In more detail, the SAO encoding apparatus 10 may determine one bandgroup including consecutive bands from among all bands. For example, the SAO encoding apparatus 10 may determine one bandgroup #1 including four consecutive bands, and may transmit offset values of the four determined consecutive bands. In this case, the SAO encoding apparatus 10 does not transmit the offset values of all bands but transmits information indicating a position of a start band included in the bandgroup #1 and the offset values of the four consecutive bands, thus, performance deterioration due to an increase in a signalling overhead does not occur.

Due to a characteristic of a band type, it is efficient that an offset value is transmitted via a low band width and a high band width.

In addition, in a case of the band type as the SAO type, the SAO encoding apparatus 10 according to an embodiment may efficiently transmit an offset value of a band. In more detail, the SAO encoding apparatus 10 according to an embodiment of the present disclosure may determine a plurality of bandgroups and may transmit offset values of the plurality of determined bandgroups, so that distortion between an original image and a reconstructed image may be efficiently reduced, and performance deterioration due to an increase in a signalling overhead may be prevented. Here, the plurality of bandgroups may not be consecutive.

For example, the SAO encoding apparatus 10 may transmit bandgroup position information of each of the plurality of bandgroups and offset value information of each of bands included in the plurality of bandgroups, so that distortion between an original image and a reconstructed image may be efficiently reduced, and performance deterioration due to an increase in a signalling overhead may be prevented.

The SAO parameter determiner 12 according to an embodiment of the present disclosure may determine a plurality of bandgroups including some bands from among all bands so as to compensate for a pixel sample value of a current block included in a video. Here, the plurality of bandgroups may not be adjacent to each other. That is, the plurality of bandgroups may not be consecutive. However, the plurality of bandgroups are not limited thereto and thus may be adjacent to each other.

Here, the SAO parameter determiner 12 may determine the plurality of bandgroups having an optimal rate-distortion cost so that distortion between an original image and a reconstructed image included in the current block may be decreased, and a bitstream may include less SAO parameter information.

When the SAO parameter determiner 12 determines the plurality of bandgroups so as to compensate for the pixel sample value of the current block included in the video, the SAO parameter determiner 12 may determine the current block as an LCU included in the video.

In addition, the SAO parameter determiner 12 may determine bandgroup position information indicating a position of each of the plurality of determined bandgroups, and may determine offsets with respect to bands included in each of the bandgroups. Here, each of the bandgroups determined by the SAO parameter determiner 12 may include at least one band. However, it is not limited thereto, and the SAO parameter determiner 12 may determine each bandgroup to include at least two neighboring bands.

For example, when N bands are present (where N may be 16 or 32), the SAO parameter determiner 12 may determine K offsets for each of M groups. That is, the SAO parameter determiner 12 may determine M pieces of start band position information and M*K pieces of offset information (O[0], O[1], ..., O[M*K−1], M*K<=N).

In addition, bandgroup position information determined by the SAO parameter determiner 12 may include information indicating a position of a start band included in each bandgroup.

In addition, the SAO parameter determiner 12 may determine two bandgroups. Each of the bandgroups determined by the SAO parameter determiner 12 may include two bands.

The bitstream generator 14 according to an embodiment of the present disclosure may generate a bitstream including position information of the plurality of bandgroups determined by the SAO parameter determiner 12, the offsets, and an encoded video. Here, the position information of the plurality of bandgroups, the offsets, and the encoded video may be entropy encoded, and the bitstream including the position information of the plurality of bandgroups, the offsets of bands included in each of the bandgroups, and the video which are entropy encoded may be generated.

For example, when N bands are present (where N may be 16 or 32), the SAO parameter determiner 12 may determine K offsets for each of M groups to have an optimal rate-distortion cost. That is, the SAO parameter determiner 12 may determine M pieces of start band position information (p[0], ..., p[M]) and M*K offsets (O[0], O[1], ..., O[M*K−1], M*K<=N), and the bitstream generator 14 may entropy encode the M pieces of start band position information and the K offsets, and may generate a bitstream including M pieces of entropy-encoded start band position information and entropy-encoded K offsets.

When a total sum of bands is a positive integer N (>2), and a value of $\log_2 N$ has a value of $M < \log_2 N <= M+1$ with respect to the positive integer N, the bitstream generator 14 may binarize start band position information according to a fixed length coding (FLC) scheme by using M+1 bits in total, and may generate a bitstream including the binarized start band position information. In more detail, when two pieces of start position information are present, and the bitstream generator 14 determines a start band position to be in a range between $0^{th}$ band and $15^{th}$ band and a range between $N/2+1^{th}$ band and $N^{th}$ band, the bitstream generator 14 may binarize each of a plurality of pieces of start band position information according to the FLC scheme by using M bit.

When N of the total sum of bands is 32, a start band position of a first bandgroup may be determined as one band in the range between $0^{th}$ band and $15^{th}$ band, and a start band position of a second bandgroup may be determined as one band in a range between $16^{th}$ band and $31^{st}$ band, thus, information indicating a start band position of each bandgroup may be binarized according to the FLC scheme by using 4 bits. When a position of a start band of each of two bandgroups is binarized according to the FLC scheme by using M bit, binarization is performed by using a total sum of 2*M bits, however, when a range of the position of the start band of each of the two bandgroups is defined, the number of bits may be decreased by 1 with respect to start band position information of each bandgroup, so that binarization is performed by using a total sum of 2M−2 bits. Therefore, when the range of the position of the start band of each of the two bandgroups is limited, the position of the start band of each of the two bandgroups may be expressed with M bit, so that 2 bits may be saved compared to a case in which binarization is performed according to the FLC scheme.

According to entropy encoding methods, SAO parameters according to an embodiment of the present disclosure may be classified into parameters to be encoded based on context-based entropy coding, and parameters to be encoded in a bypass mode.

The context-based entropy coding method may include a series of operations such as binarization for transforming symbols such as the SAO parameters into a bitstream, and context-based arithmetic encoding on the bitstream. Context adaptive binary arithmetic coding (CABAC) is broadly used an example of the context-based arithmetic encoding method. According to context-based arithmetic encoding and decoding, each bit of a symbol bitstream may be regarded as a bin of context, and each bit position may be mapped to a bin index. A length of the bitstream, i.e., a length of bins, may vary according to sizes of symbol values. For context-based arithmetic encoding and decoding, context-based probability modeling needs to be performed on symbols.

Context-based probability modeling needs to be performed on the assumption that a coding bit of a current symbol is probabilistically predicted based on previously encoded symbols. For context-based probability modeling, context of each bit position of a symbol bitstream, i.e., each bin index, needs to be newly updated. Here, probability modeling refers to a process of analyzing a probability that 0 or 1 is generated in each bin. A process of updating context by reflecting a result of analyzing a probability of each bit of the symbols of a new block to the context may be repeated in every block. If the above-described probability modeling is repeated, a probability model in which each bin is matched to a probability may be determined.

Accordingly, with reference to the context-based probability model, an operation of selecting and outputting a code corresponding to current context may be performed with respect to each bit of a binarized bitstream of current symbols, thereby performing context-based entropy encoding. A context index generated after the context-based entropy encoding is performed, and an initial value may be transmitted.

An operation of determining a context-based probability model of each bin of symbols for context-based entropy encoding requires large amounts of calculation and calculation time. On the other hand, the entropy encoding in a bypass mode includes an entropy encoding operation using a probability model for which context of symbols is not considered.

A video decoding method for signaling of SAO parameters according to an embodiment of the present disclosure will now be described in more detail with reference to FIG. 1B.

In operation 11, the SAO encoding apparatus 10 may determine a plurality of bandgroups so as to compensate for a pixel sample value of a current block included in a video. Here, the plurality of bandgroups may not be consecutive.

The SAO encoding apparatus 10 may determine a plurality of bandgroups including some bands from among all bands so as to compensate for the pixel sample value of the current block included in the video. Here, the plurality of bandgroups may not be adjacent to each other.

The SAO encoding apparatus 10 may determine the plurality of bandgroups having an optimal rate-distortion cost so that distortion between an original image and a reconstructed image included in the current block may be decreased, and a bitstream may include less SAO parameter information.

When the SAO encoding apparatus 10 determines the plurality of bandgroups so as to compensate for the pixel sample value of the current block included in the video, the SAO encoding apparatus 10 may determine the current block as an LCU included in the video.

In operation 13, the SAO encoding apparatus 10 determines bandgroup position information indicating a position of each of the determined bandgroups.

Here, each of the bandgroups determined by the SAO encoding apparatus 10 may include at least one band.

However, it is not limited thereto, and the SAO encoding apparatus 10 may determine each bandgroup to include at least two neighboring bands.

In addition, bandgroup position information determined by the SAO encoding apparatus 10 may include information indicating a position of a start band included in each bandgroup.

In addition, the SAO encoding apparatus 10 may determine two bandgroups. Each of the bandgroups determined by the SAO encoding apparatus 10 may include two bands.

In operation 15, the SAO encoding apparatus 10 may determine offsets with respect to bands included in each bandgroup.

In operation 17, the SAO encoding apparatus 10 may generate a bitstream including position information of the plurality of determined bandgroups, the determined offsets, and an encoded video. Here, the position information indicating each of the plurality of bandgroups, the offsets, and the encoded video may be entropy encoded, and the bitstream including the position information of the plurality of bandgroups, the offsets, and the video which are entropy encoded may be generated.

The SAO encoding apparatus 10 according to an embodiment of the present disclosure may include a central processor (not shown) that generally controls the SAO parameter determiner 12 and the bitstream generator 14. Alternatively, the SAO parameter determiner 12 and the bitstream generator 14 may operate by their respective processors (not shown) that organically operate, and thus, the SAO encoding apparatus 10 may operate as a whole. Alternatively, the SAO parameter determiner 12 and the bitstream generator 14 may be controlled according to the control of an external processor (not shown) of the SAO encoding apparatus 10 according to an embodiment.

The SAO encoding apparatus 10 according to an embodiment may include one or more data storages (not shown) that store input and output data of the SAO parameter determiner 12 and the bitstream generator 14. The SAO encoding apparatus 10 may include a memory controller (not shown) that controls data input and output of the one or more data storages (not shown).

In order to perform a video encoding operation including transformation and to output a result of the video encoding operation, the SAO encoding apparatus 10 according to an embodiment may operate in association with an internal or external video encoding processor.

The internal video encoding processor of the SAO encoding apparatus 10 according to an embodiment of the present disclosure may be an independent processor capable of performing a video encoding operation. Also, the SAO encoding apparatus 10, a central processing unit, or a graphic processing unit may include a video encoding processor module to perform a basic video encoding operation.

Figure 2A:
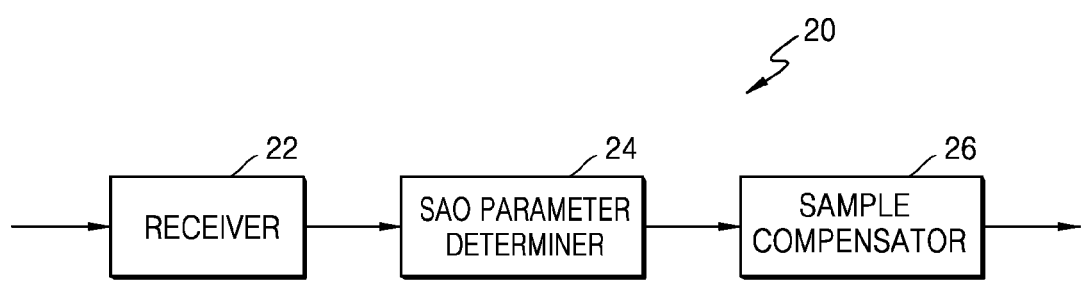
FIGS. 2A and 2B, respectively, show a block diagram of an SAO decoding apparatus and a flowchart of an SAO decoding method, according to an embodiment of the present disclosure.
Figure 2B:
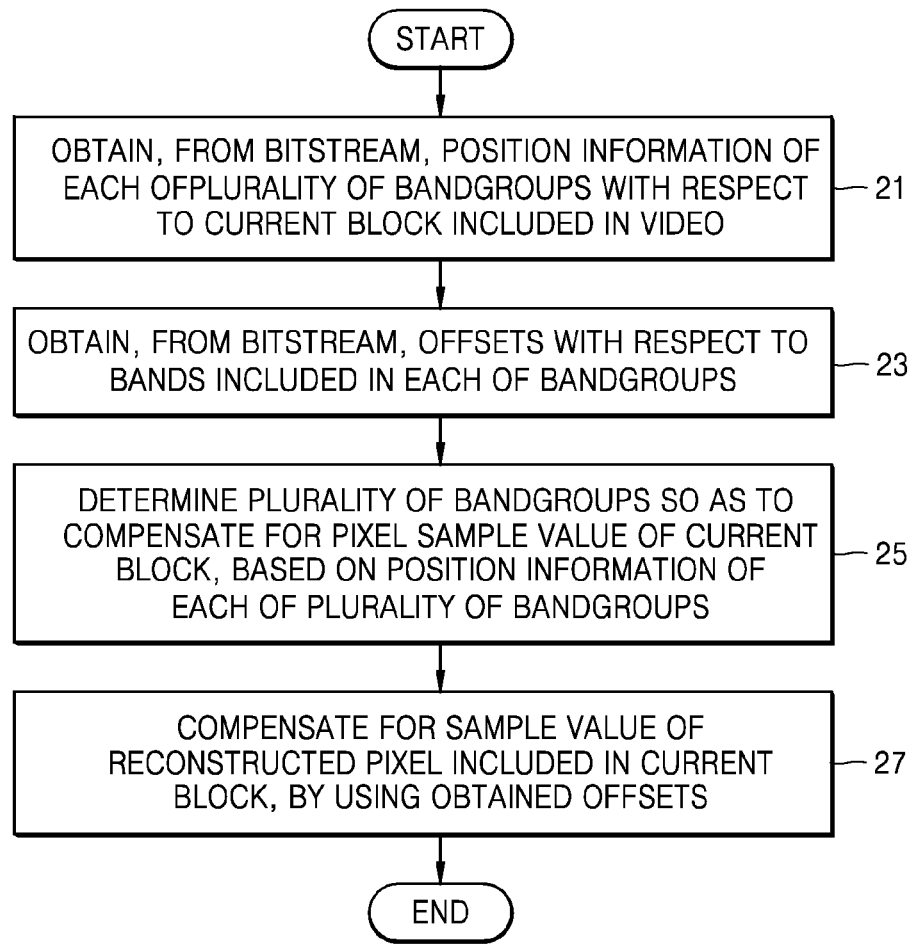

FIGS. 2A and 2B, respectively, show a block diagram of an SAO decoding apparatus and a flowchart of an SAO decoding method, according to an embodiment.

A SAO decoding apparatus 20 according to an embodiment includes a receiver 22, a SAO parameter determiner 24, and a sample compensator 26.

The SAO decoding apparatus 20 according to an embodiment receives a bitstream including encoded data of a video.

The SAO decoding apparatus 20 may parse encoded video samples from the received bitstream, may perform entropy decoding, inverse-quantization, inverse-transformation, prediction, and motion compensation on each image block to generate reconstructed pixels, and thus may generate a reconstructed image.

The SAO decoding apparatus 20 according to an embodiment may receive offset values indicating difference values between original pixels and reconstructed pixels, and may minimize an error between an original image and the reconstructed image.

The video decoding apparatus 20 may receive encoded data of each LCU of the video, and may reconstruct each LCU based on coding units split from each LCU and having a tree structure.

Hereinafter, a method of reconstructing samples of a current LCU and adjusting offsets will now be described in detail with reference to FIG. 2B.

In operation 21, the receiver 22 obtains, from a bitstream, position information of each of a plurality of bandgroups with respect to a current block included in a video. Here, the plurality of bandgroups may not be consecutive with respect to each other.

In operation 23, the receiver 22 may obtain, from the bitstream, offsets with respect to bands included in each of the bandgroups.

The receiver 22 may obtain an SAO parameter of the current LCU from a received bitstream.

In this regard, the SAO parameter may include an SAO type of the current LCU, an offset value, and an SAO class. Here, the SAO class may include position information or edge direction information of a bandgroup according to the SAO type.

Hereinafter, in operation 25, it is assumed that the SAO type is a band type.

In operation 25, the SAO parameter determiner 24 may determine the plurality of bandgroups so as to compensate for a sample value of the current block, based on the position information of each of the plurality of bandgroups. Here, the plurality of bandgroups may not be consecutive.

In addition, the SAO parameter determiner 24 may obtain, from the bitstream, offset information with respect to bands included in each of the bandgroups, and may determine offsets with respect to the bands included in each of the bandgroups, based on the obtained offset information.

Here, each of the bandgroups determined by the SAO encoding apparatus 10 may include at least one band.

In operation 27, the sample compensator 26 may compensate for a sample value of a reconstructed pixel included in the current block, by using the obtained offsets.

The SAO parameter determiner 24 may determine whether a pixel value classification method of the current LCU is an edge type or a band type, based on the SAO type determined by the receiver 22. Based on the SAO type, an off type, the edge type, or the band type may be determined. If the SAO type is the off type, it may be determined that an offset adjustment operation is not applied to the current LCU. In this case, other offset parameters of the current LCU do not need to be parsed.

The SAO parameter determiner 24 may determine a band range according to an edge direction according to the edge type or a band range according to a band type of the current LCU, based on the SAO class determined by the receiver 22.

The SAO parameter determiner 24 may determine difference values between reconstructed pixels and original pixels included in the above-determined SAO class, based on the offset values determined by the receiver 22.

For example, the SAO parameter determiner 24 may determine band offsets to be applied to the reconstructed pixels, by using the position information of the plurality of bandgroups and offset values as illustrated in Table 1 below. Although they are named as band offsets here, they also be referred to as interval offsets.

TABLE 1

```
for(m=0;m<M; m++)
{
    for(k=0;k<K;k++)
    {
        B0[p[m]+k]=0[m*K+k];
    }
}
```

Referring to Table 1, when N bands are present, the SAO parameter determiner 24 determines M pieces of start band position information (p[0], p[1], p[2], ..., p[m−1]), and N band offsets by using the M pieces of start band position information and M*K offset values (O[0], O[1], ..., O[M*K−1], M*K<=N). In more detail, the SAO parameter determiner 24 may initialize all band offset values as 0 (B0[0]=B0[1]=BO[N−1]=0) and then may determine values of bands (BO[p[m]+k]) included in M bandgroups as shown in Table 1. Here, the M pieces of start band position information and the M*K offset values obtained from a bitstream are parsed, and offset values with respect to bands included in the M bandgroups may be determined by using the M pieces of parsed start band position information and the M*K parsed offset values.

For example, when N=32, M=2, K=2, the SAO encoding apparatus 10 includes, in a bitstream, start band position information regarding two bandgroups from band types in which a total sum of 32 bands are present, and offset value information of two bands included in each of two bandgroups, and transmits the bitstream.

The SAO decoding apparatus 20 may parse, from the bitstream, the start band position information regarding the two bandgroups from the band types in which a total sum of 32 bands are present, and the offset value information of bands included in each of two bandgroups, and may determine band offsets, based on the parsed start band position information regarding the two bandgroups and the parsed offset value information of the bands included in each of two bandgroups. In operation 25, the sample compensator 26 may adjust pixel values of samples reconstructed based on coding units split from the current LCU and having a tree structure, by the difference values determined by the SAO parameter determiner 24. The SAO decoding apparatus 20 according to an embodiment may include a central processor (not shown) that generally controls the receiver 22, the SAO parameter determiner 24, and the sample compensator 26. Alternatively, the receiver 22, the SAO parameter determiner 24, and the sample compensator 26 may operate by their respective processors (not shown) that organically operate, and thus, the SAO decoding apparatus 20 may operate as a whole. Alternatively, the receiver 22, the SAO parameter determiner 24, and the sample compensator 26 may be controlled according to the control of an external processor (not shown) of the SAO decoding apparatus 20 according to an embodiment.

The SAO decoding apparatus 20 according to an embodiment may include one or more data storages (not shown) that store input and output data of the receiver 22, the SAO parameter determiner 24, and the sample compensator 26. The SAO decoding apparatus 20 may include a memory controller (not shown) that controls data input and output of the one or more data storages (not shown).

In order to perform a video decoding operation to reconstruct a video, the SAO decoding apparatus 20 according to an embodiment may operate in association with an internal or external video decoding processor. The internal video decoding processor of the SAO decoding apparatus 20 according to an embodiment may be an independent processor capable of performing a basic video decoding operation. Also, the SAO decoding apparatus 20, a central processing unit, or a graphic processing unit may include a video decoding processor module to perform a basic video decoding operation.

Figure 3:
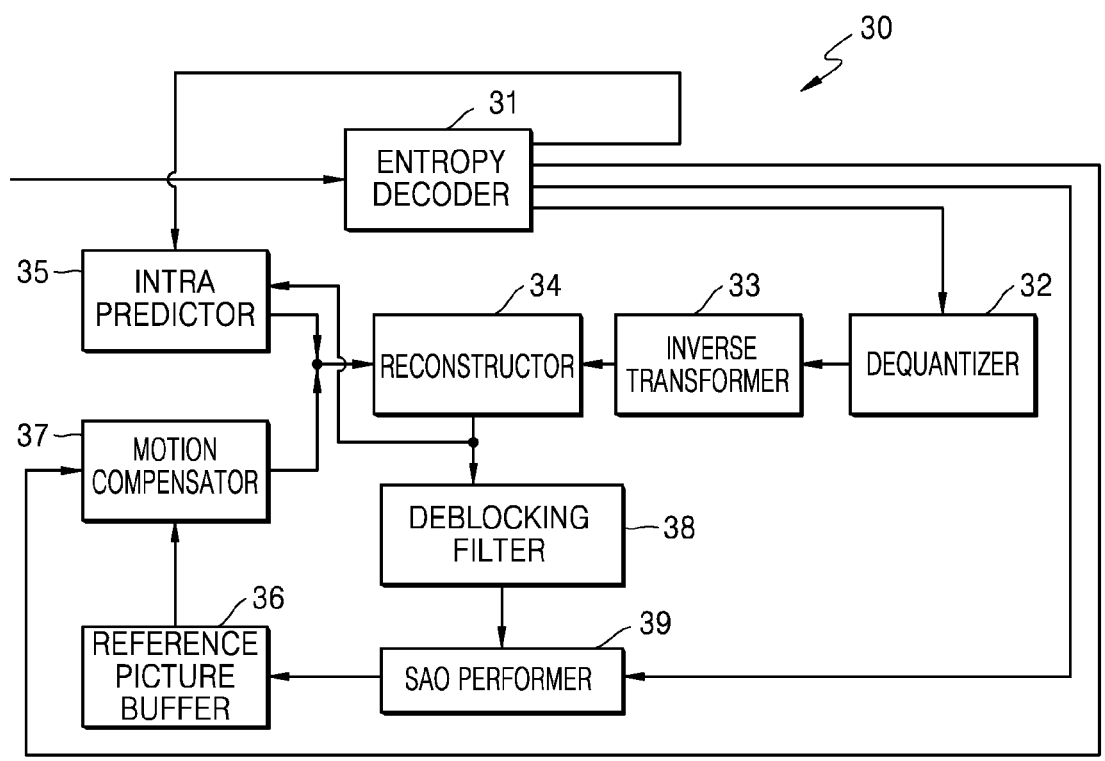
FIG. 3 shows a block diagram of a video decoding apparatus, according to an embodiment of the present disclosure.

Hereinafter, with reference to FIG. 3, video decoding operations using SAO will now be described in detail. FIG. 3 shows a block diagram of a video decoding apparatus, according to an embodiment.

A video decoding apparatus 30 includes an entropy decoder 31, an inverse-quantizer 32, an inverse-transformer 33, a reconstructor 34, an intra predictor 35, a reference picture buffer 36, a motion compensator 37, a deblocking filter 38, and a SAO unit 39.

The video decoding apparatus 30 may receive a bitstream including encoded video data. The entropy decoder 31 may parse intra mode information, inter mode information, SAO information, and residues from the received bitstream.

Residue data reconstructed by the entropy decoder 31 may be quantized transformation coefficients. Accordingly, the inverse-quantizer 32 may perform inverse-quantization on the residue data to reconstruct transformation coefficients, and the inverse-transformer 33 may perform inverse transformation on the reconstructed coefficients of a reconstructed transformation domain and thus may reconstruct residue values of the spatial domain.

In order to predict and reconstruct the residue values of the spatial domain, intra prediction or motion compensation may be performed.

If the intra mode information is extracted by the entropy decoder 31, the intra predictor 35 may determine reference samples to be referred to reconstruct current samples from among samples spatially adjacent to the current samples, by using the intra mode information. The reference samples may be selected from among samples previously reconstructed by the reconstructor 34.

The reconstructor 34 may reconstruct the current samples by using the reference samples determined based on the intra mode information and the residue values reconstructed by the inverse-transformer 33.

If the inter mode information is extracted by the entropy decoder 31, the motion compensator 37 may determine a reference picture to be referred to reconstruct current samples of a current picture from among pictures reconstructed previously to the current picture, by using the inter mode information. The inter mode information may include motion vectors, reference indices, etc. By using the reference indices, from among pictures reconstructed previously to the current picture and stored in the reference picture buffer 36, a reference picture to be used to perform motion compensation on the current samples may be determined. By using the motion vectors, a reference block of the reference picture to be used to perform motion compensation on a current block may be determined. The reconstructor 34 may reconstruct the current samples by using the reference block determined based on the inter mode information and the residual values reconstructed by the inverse-transformer 33.

The reconstructor 34 may reconstruct samples and may output reconstructed pixels. The reconstructor 34 may generate reconstructed pixels of each of LCUs based on coding units having a tree structure.

The deblocking filter 38 may perform filtering for reducing a blocking phenomenon of pixels disposed at edge regions of the LCU or each of the coding units having a tree structure.

Also, the SAO unit 39 may adjust offsets of reconstructed pixels of each LCU according to a SAO scheme. The SAO unit 39 may determine a SAO type, a SAO class, and offset values of a current LCU based on the SAO information extracted by the entropy decoder 31.

An operation of extracting SAO parameters from the SAO information by the entropy decoder 31 may correspond to an operation of the receiver 22 of the SAO decoding apparatus 20, and operations of the SAO unit 39 may correspond to operations of the SAO parameter determiner 24 and the sample compensator 26 of the SAO decoding apparatus 20.

The SAO unit 39 may determine signs and difference values of the offset values with respect to the reconstructed pixels of the current LCU, based on the SAO offset values. The SAO unit 39 may reduce errors between the reconstructed pixels and original pixels by increasing or decreasing pixel values of the reconstructed pixels by the difference values determined based on the offset values.

A picture including the reconstructed pixels offset-adjusted by the SAO unit 39 may be stored in the reference picture buffer 36. Thus, by using a reference picture having minimized errors between reconstructed samples and original pixels according to a SAO operation, motion compensation may be performed on a next picture.

According to the SAO schemes, based on difference values between reconstructed pixels and original pixels, an offset of a pixel group including the reconstructed pixels may be determined. For the SAO schemes, embodiments for classifying reconstructed pixels into pixel groups will now be described in detail.

According to the SAO schemes, pixels may be classified (i) based on an edge type of reconstructed pixels, or (ii) a band type of reconstructed pixels. Whether pixels are classified based on an edge type or a band type may be defined according to a SAO type.

An embodiment of classifying pixels based on an edge type according to the SAO schemes is obvious to one of ordinary skill in the art, thus, detailed descriptions thereof are not provided here.

Next, an embodiment of classifying pixels based on a band type according to the SAO schemes is described in detail with reference to FIG. 4.

Figure 4:
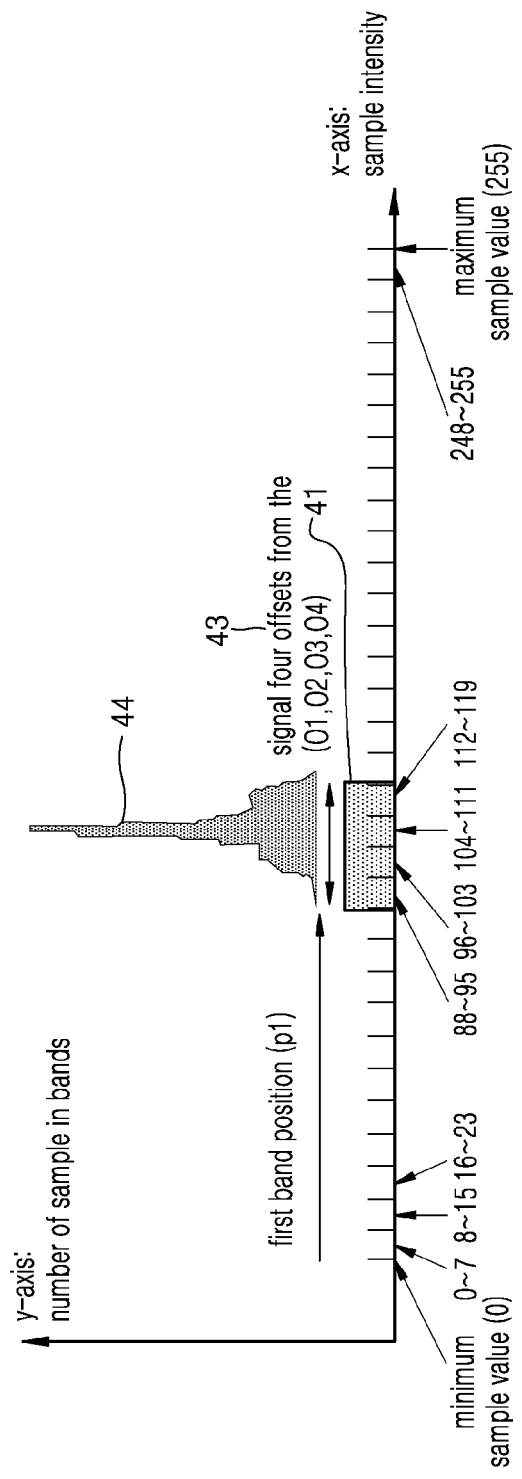
FIG. 4 shows a diagram for describing a process (in which one band group is determined) of determining consecutive bands in a band type for which sample adjustment is performed, according to an embodiment of the present disclosure.

FIG. 4 shows a diagram for describing a process (in which one band group is determined) of determining consecutive bands in a band type for which sample adjustment is performed, according to an embodiment of the present disclosure.

When it is determined that pixels are classified according to a band type of reconstructed pixels, the SAO decoding apparatus 20 may classify the reconstructed pixels into bands having similar values. The SAO decoding apparatus 20 may obtain band offset information from a bitstream, and when a band offset is determined according to the obtained band offset information, the SAO decoding apparatus 20 may decrease a difference between a reconstructed image and an original image by adding the band offset according to each band. In more detail, according to an embodiment of the present disclosure, each of pixel values of the reconstructed pixels may belong to one of a plurality of bands. For example, the pixel values may have a total range from a minimum value Min of 0 to a maximum value Max of $2^{(p-1)}$ according to p-bit sampling. If the total range (Min, Max) of the pixel values is divided into K intervals, each interval of the pixel values is referred to as a band. If $B_k$ indicates a maximum value of a kth band, bands [B0, B1−1], [B1, B2−1], [B2, B3−1], . . . , and [Bk−1, Bk] may be divided. If a pixel value of a current reconstructed pixel Rec(x,y) belongs to the band [B$_{k-1}$, B$_k$], a current band may be determined as k. The bands may be uniformly or ununiformly divided.

For example, referring to FIG. 4, if pixel values are classified into uniform bands of 8-bit pixel, the pixel values may be divided into 32 bands. In more detail, the pixel values may be classified into bands [0, 7], [8, 15], . . . , [240, 247], and [248, 255].

From among a plurality of bands classified according to a band type, a band to which each of pixel values of reconstructed pixels belongs may be determined. Also, an offset value indicating an average of errors between the original pixels and the reconstructed pixels in each band may be determined. In this regard, an offset value is determined for not every band but may be determined in a manner that how many pixels from among pixels included in the current LCU belong to each band may be determined and then an offset value of a band adjacent to a band having a large number of pixels may be determined. For example, referring to FIG. 4, a bandgroup 41 may be determined based on the number of samples 44 of each band, and offset values of bands included in the determined bandgroup 41 may be determined. However, it is not limited thereto, and some bands are determined from among all bands by using various methods in order to minimize a rate-distortion cost, and some bands determined due to a small rate-distortion cost may be finally determined as bands for adjusting reconstructed pixel values.

Accordingly, the SAO encoding apparatus 10 and the SAO decoding apparatus 20 may encode and transceive an offset corresponding to each of bands classified according to a current band type, and may adjust reconstructed pixels by the offset.

Accordingly, with respect to a band type, the SAO encoding apparatus 10 and the SAO decoding apparatus 20 according to an embodiment may classify reconstructed pixels according to bands to which their pixel values belong, may determine an offset as an average of error values of reconstructed pixels that belong to the same band, and may adjust the reconstructed pixels by the offset, thereby minimizing an error between an original image and a reconstructed image.

When an offset according to a band type is determined, the SAO encoding apparatus 10 and the SAO decoding apparatus 20 according to an embodiment may classify reconstructed pixels into categories according to a band position. For example, if the total range of the pixel values is divided into K bands, categories may be indexed according to a band index k indicating a kth band. The number of categories may be determined to correspond to the number of bands.

However, in order to reduce an amount of data, the SAO encoding apparatus 10 and the SAO decoding apparatus 20 may limit the number of categories used to determine offsets according to SAO schemes. For example, a predetermined number of bands that are continuous from a band having a predetermined start position in a direction in which a band index is increased may be allocated as categories, and only an offset of each category may be determined.

For example, if a band 88~95 having an index of 12 is determined as a start band, four bands from the start band, i.e., bands having indices of 12, 13, 14, and 15 may be allocated as categories 1, 2, 3, and 4. Accordingly, an average error between reconstructed pixels and original pixels included in a band having the index of 12 may be determined as an offset O1 of category 1. Likewise, an average error between reconstructed pixels and original pixels included in a band 96~103 having the index of 13 may be determined as an offset O2 of category 2, an average error between reconstructed pixels and original pixels included in a band 104~111 having the index of 14 may be determined as an offset O3 of category 3, and an average error between reconstructed pixels and original pixels included in a band 112~119 having the index of 15 may be determined as an offset O4 of category 4.

In this case, information regarding a band range start position, i.e., a left band position, is required to determine positions of bands allocated as categories. Accordingly, the SAO encoding apparatus 10 according to an embodiment may encode and transmit left start point information indicating a position of the left band, as the SAO class. For example, referring to FIG. 4, the SAO encoding apparatus 10 may encode and transmit information P1 indicating a left start band 42 of the bandgroup 41.

The SAO encoding apparatus 10 may encode and transmit a SAO type indicating a band type, a SAO class, and offset values according to categories. For example, referring to FIG. 4, a plurality of pieces of information O1, O2, O3, and O4 respectively indicating offset values 43 of bands of the bandgroup 41 may be encoded and transmitted. The SAO decoding apparatus 20 according to an embodiment may receive the SAO type, the SAO class, and the offset values according to the categories. If the received SAO type is a band type, the SAO decoding apparatus 20 may read a start band position from the SAO class. The SAO decoding apparatus 20 may determine a band to which reconstructed pixels belong, from among four bands from the start band, may determine an offset value allocated to a current band from among the offset values according to the categories, and may adjust pixel values of the reconstructed pixels by the offset value.

Figure 5:
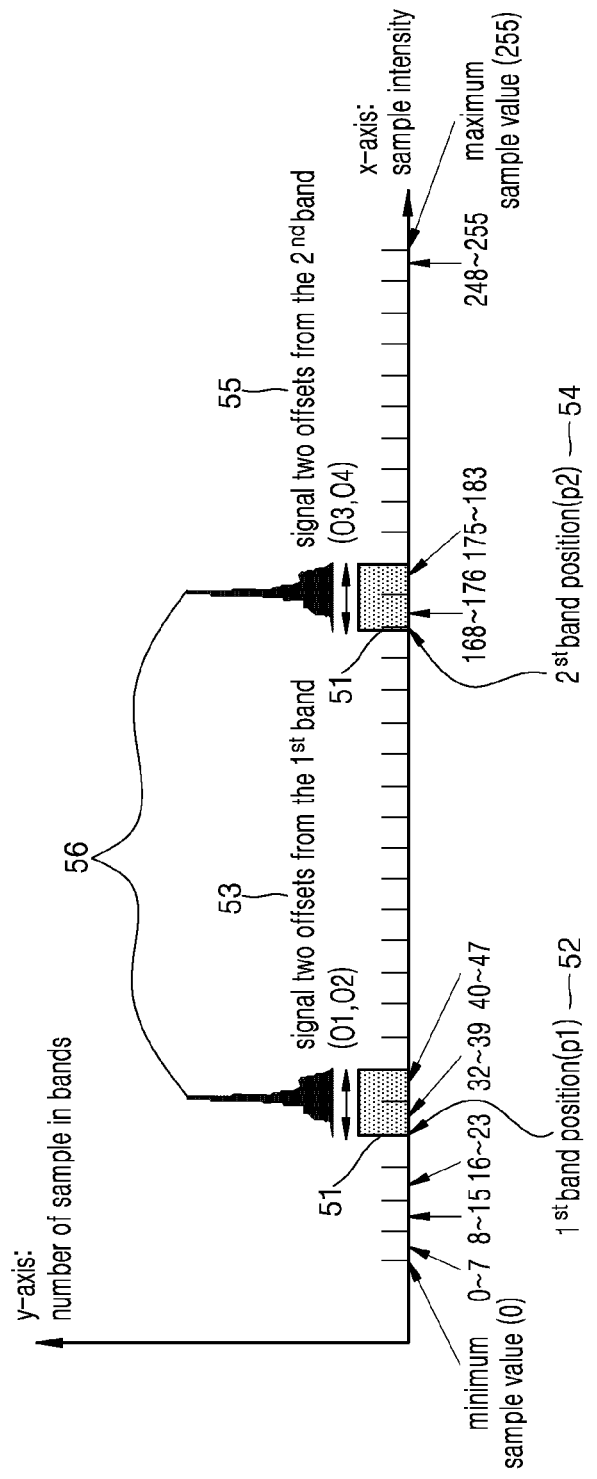
FIG. 5 shows a diagram for describing a process (in which a plurality of band groups are determined) of determining non-consecutive bands in a band type for which sample adjustment is performed, according to another embodiment of the present disclosure.

FIG. 5 shows a diagram for describing a process (in which a plurality of band groups are determined) of determining non-consecutive bands in a band type for which sample adjustment is performed, according to another embodiment of the present disclosure.

Referring to FIG. 5, when the SAO encoding apparatus 10 and the SAO decoding apparatus 20 according to an embodiment of the present disclosure limit the number of categories used in determining offsets according to a SAO technique, a predetermined number of bands that are not consecutive but are separate from each other are respectively allocated as categories, and an offset may be determined with respect to each of the categories. For example, referring to FIG. 5, a plurality of bandgroups 51 may be determined based on the number of samples 56 of each band, and offset values of bands included in the plurality of determined bandgroups 51 may be determined.

For example, if a band 32~39 having an index of 5 and a band 168~175 having an index of 22 are determined as start bands of bandgroups, respectively, two bands from a start band of each bandgroup, i.e., bands having indices of 5, 6, 22, and 23 may be allocated as categories 1, 2, 3, and 4, respectively. Accordingly, an average error between reconstructed pixels and original pixels included in the band 32~39 having the index of 5 may be determined as an offset O1 of the category 1. Likewise, an average error between reconstructed pixels and original pixels included in a band 40~47 having an index of 6 may be determined as an offset O2 of category 2, and an average error between reconstructed pixels and original pixels included in a band 168~175 having the index of 22 may be determined as an offset O3 of category 3, and an average error between reconstructed pixels and original pixels included in a band 176~183 having the index of 23 may be determined as an offset O4 of category 4.

In this case, information regarding positions at which the plurality of bandgroups start, i.e., information regarding a position of a left band included in each of the bandgroups, is required to determine the positions of the bandgroups allocated as categories. Accordingly, the SAO encoding apparatus 10 according to an embodiment may encode and transmit left start point information indicating a position of the left band, as the SAO class. For example, the SAO encoding apparatus 10 may encode and transmit the indices of 5 and 22 as left start point information of each bandgroup, and does not need to encode indices of all bands.

The SAO encoding apparatus 10 may transmit the offsets of each band included in each bandgroup. For example, referring to FIG. 5, the SAO encoding apparatus 10 may transmit a plurality of pieces of information O1, O2, O3, and O4 indicating offset values 53 and 55 of bands included in first and second bandgroups 51.

For example, referring to FIG. 5, offset values O1 and O2 of a band having an index of 5 and a band having an index of 6 which are included in one bandgroup may be transmitted without the indices, and offset values O3 and O4 of a band having an index of 22 and a band having an index of 23 which are included in another bandgroup may be transmitted without the indices. When offset values of bands included in each of the bandgroup are transmitted, the offset values may be sequentially transmitted in an order of the bandgroups.

In this manner, the SAO encoding apparatus 10 may encode and transmit the SAO type indicating the band type, the SAO class, and the offset values of the categories.

The SAO decoding apparatus 20 according to an embodiment may receive the SAO type, the SAO class, and the offset values of the categories.

When the received SAO type is the band type, the SAO decoding apparatus 20 may read a position of a start band from the SAO class.

For example, referring back to FIG. 4, the SAO decoding apparatus 20 may determine which band from the start band of the bandgroup 41 reconstructed pixels belong to, may determine an offset value allocated to a current band, the offset value being from among the offset values of the categories, and may adjust a reconstructed pixel value by the offset value.

Referring back to FIG. 5, when the received SAO type is the band type, the SAO decoding apparatus 20 may read positions of a plurality of non-consecutive bandgroups from the SAO class.

For example, the SAO decoding apparatus 20 determines a plurality of bandgroup 51 based on the number of bands of each bandgroup, which is predetermined, from information indicating start bands 52 and 54 (P1,P2) of the bandgroups, respectively, and determines which band from among bands of each bandgroup the reconstructed pixel belong to. The SAO decoding apparatus 20 may determine an offset value allocated to a current band, the offset value being from among offset values of the categories, and may adjust a reconstructed pixel value by the offset value. Hereinafter, SAO parameters encoded and transceived by the SAO encoding apparatus 10 and the SAO decoding apparatus 20 will now be described in detail.

The SAO encoding apparatus 10 and the SAO decoding apparatus 20 according to an embodiment may determine a SAO type according to a pixel classification scheme of reconstructed pixels of each LCU.

The SAO type may be determined according to image characteristics of each block. For example, with respect to an LCU including a vertical edge, a horizontal edge, and a diagonal edge, in order to change edge values, offset values may be determined by classifying pixel values according to an edge type. With respect to an LCU not including an edge region, offset values may be determined according to band classification. Accordingly, the SAO encoding apparatus 10 and the SAO decoding apparatus 20 may signal the SAO type with respect to each of LCUs.

The SAO encoding apparatus 10 and the SAO decoding apparatus 20 according to an embodiment may determine SAO parameters with respect to each LCU. That is, SAO types of reconstructed pixels of an LCU may be determined, the reconstructed pixels of the LCU may be classified into categories, and offset values may be determined according to the categories.

From among the reconstructed pixels included in the LCU, the SAO encoding apparatus 10 may determine an average error of reconstructed pixels classified into the same category, as an offset value. An offset value of each category may be determined.

According to an embodiment, the SAO parameters may include a SAO type, offset values, and a SAO class. The SAO encoding apparatus 10 and the SAO decoding apparatus 20 may transceive the SAO parameters determined with respect to each LCU.

From among SAO parameters of an LCU, the SAO encoding apparatus 10 according to an embodiment may encode and transmit the SAO type and the offset values. If the SAO type is an edge type, the SAO encoding apparatus 10 according to an embodiment may further transmit a SAO class indicating an edge direction, which is followed by the SAO type and the offset values according to categories. If the SAO type is a band type, the SAO encoding apparatus 10 according to an embodiment may further transmit a SAO class indicating a start band position, which is followed by the SAO type and the offset values according to categories.

In particular, if the SAO type is the band type, the SAO encoding apparatus 10 may transmit a SAO class indicating a position of a start band of a plurality of non-consecutive bandgroups. Here, when the SAO type is the band type, the SAO encoding apparatus 10 may transmit a SAO class indicating a position of a start band of each of the bandgroups. However, the SAO encoding apparatus 10 is not limited to transmitting the position of the start band of each bandgroup, and may transmit information indicating an absolute position of each bandgroup. When the SAO encoding apparatus 10 transmits an SAO class indicating positions of the plurality of bandgroups, the SAO encoding apparatus 10 is not limited to transmitting an absolute position of a start band of each bandgroup, and may transmit a SAO class indicating relative positions among the bandgroups.

If the SAO type is the edge type, the SAO class may be classified as edge class information, and if the SAO type is the band type, the SAO class may be classified as band position information.

The SAO decoding apparatus 20 according to an embodiment may receive the SAO parameters of each LCU, which includes the SAO type, the offset values, and the SAO class. Also, the SAO decoding apparatus 20 according to an embodiment may select an offset value of a category to which each reconstructed pixel belongs, from among the offset values according to categories, and may adjust the reconstructed pixel by the selected offset value. For example, the SAO decoding apparatus 20 may add the selected offset value to each of the reconstructed pixels and may perform clipping thereon. The clipping means a process in which, if a certain value is within a predetermined range, the value is changelessly output, and if a certain value exceeds the predetermined range, the value is not changelessly output but a value that is an approximate value of the certain value within the predetermined range is output. An embodiment of transceiving offset values from among SAO parameters will now be described.

In order to transmit the offset values, the SAO encoding apparatus 10 according to an embodiment may further transmit sign information and a remainder offset absolute value.

If the offset absolute value is 0, the sign information or the remainder offset value does not need to be encoded. However, if the offset absolute value is not 0, the sign information and the remainder offset value may be further transmitted.

However, as described above, with respect to the edge type, since the offset value may be predicted as a positive number or a negative number according to a category, the sign information does not need to be transmitted. However, if the SAO type is the band type, the offset value cannot predicted as a positive number or a negative number according to a category, the sign information may also be transmitted.

According to an embodiment, an offset value Off-set may be previously limited within a range from a minimum value MinOffSet and to a maximum value MaxOffSet before the offset value is determined (MinOffSet≤Off-Set≤MaxOffSet).

For example, with respect to an edge type, offset values of reconstructed pixels of categories 1 and 2 may be determined within a range from a minimum value of 0 to a maximum value of 7. With respect to the edge type, offset values of reconstructed pixels of categories 3 and 4 may be determined within a range from a minimum value of −7 to a maximum value of 0.

For example, with respect to a band type, offset values of reconstructed pixels of all categories may be determined within a range from a minimum value of −7 to a maximum value of 7.

In order to reduce transmission bits of an offset value, a remainder offset value may be limited to a p-bit value instead of a negative number. In this case, the remainder offset value may be greater than or equal to 0 and may be less than or equal to a difference value between the maximum value and the minimum value (0≤Remainder≤MaxOffSet−MinOffSet+1≤2^p). If the SAO encoding apparatus 10 transmits the remainder offset value and the SAO decoding apparatus 20 may know at least one of the maximum value and the minimum value of the offset value, an original offset value may be reconstructed by using only the received remainder.

Figure 6:
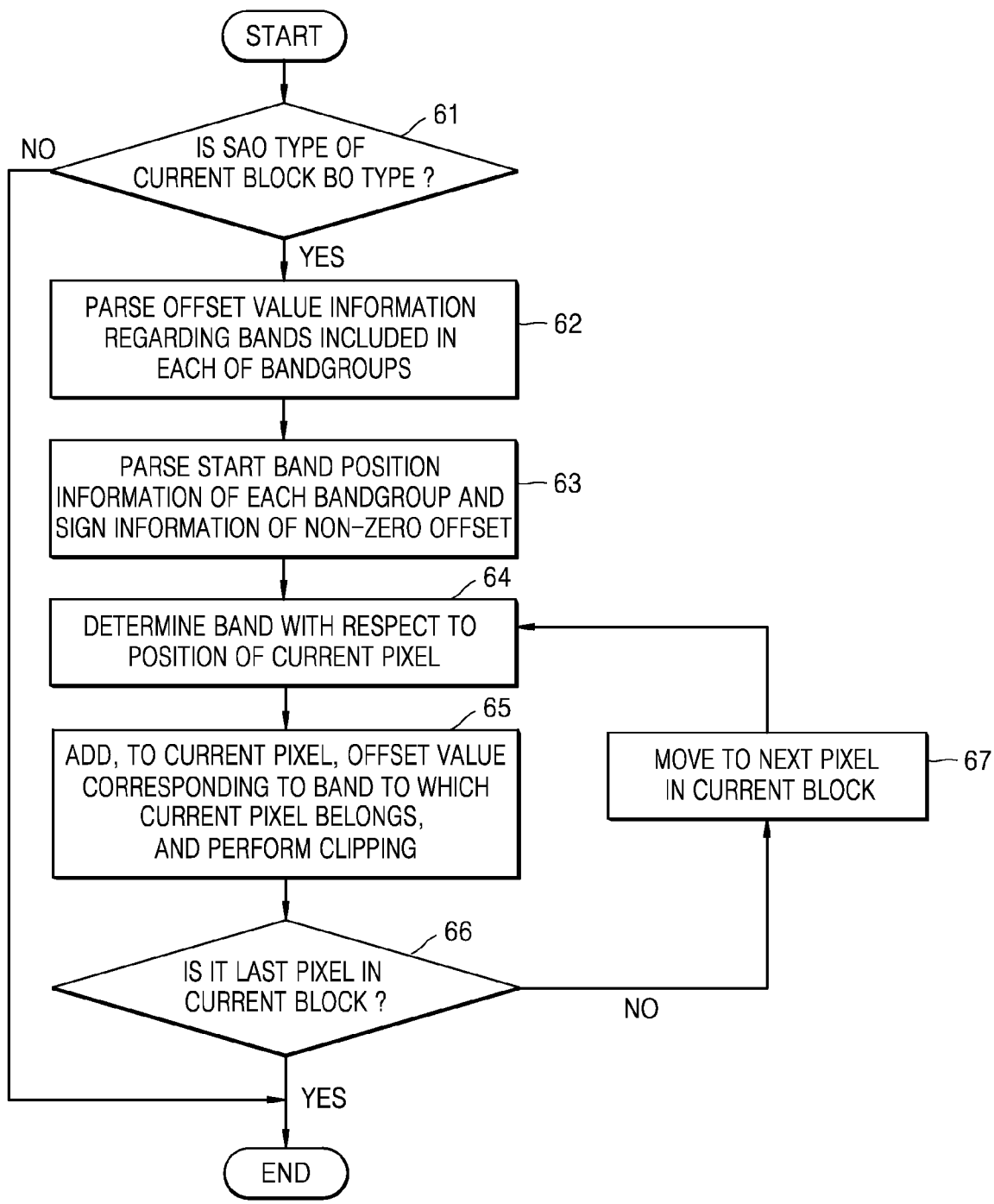
FIG. 6 is a diagram for describing a process of determining SAO parameters when an SAO type is a band type, according to an embodiment of the present disclosure.

FIG. 6 is a diagram for describing a process of determining SAO parameters when an SAO type is a band type, according to an embodiment of the present disclosure.

Referring to FIG. 6, in operation 61, the SAO decoding apparatus 20 determines whether or not a SAO type of a current block is a band offset (BO) type.

In operation 62, if the SAO type of the current block is the BO type, the SAO decoding apparatus 20 parses, from a received bitstream, offset value information regarding bands included in each of bandgroups.

In operation 63, the SAO decoding apparatus 20 parses, from the received bitstream, start band position information of each bandgroup and sign information of a non-zero offset.

In operation 64, the SAO decoding apparatus 20 determines a band with respect to a position of a current pixel included in the current block.

In operation 65, the SAO decoding apparatus 20 adds, to the current pixel, an offset value corresponding to the band to which the current pixel belongs, and performs clipping.

In operation 66, the SAO decoding apparatus 20 determines whether a currently processed pixel is a last pixel in the current block.

In operation 67, if the currently processed pixel is not the last pixel in the current block, the SAO decoding apparatus 20 may move to a next pixel in the current block, and may perform operations 64, 65, and 66 on the next pixel that is a new current pixel.

In the SAO encoding apparatus 10 according to an embodiment and the SAO decoding apparatus 20 according to an embodiment, as described above, video data may be split into LCUs, each LCU may be encoded and decoded based on coding units having a tree structure, and each LCU may determine offset values according to pixel classification. Hereinafter, with reference to FIGS. 7 through 26, an embodiment in which SAO adjustment according to pixel classification is used in a video encoding method and a video decoding method based on coding units having a tree structure according to various embodiments will be described.

Figure 7:
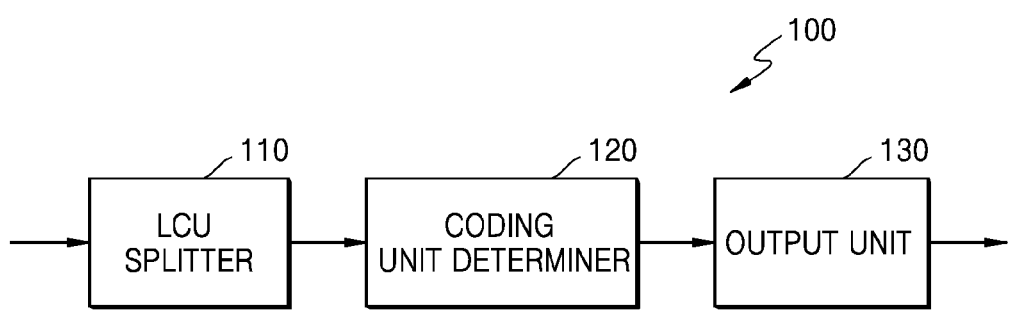
FIG. 7 shows a block diagram of a video encoding apparatus based on coding units of a tree structure, according to various embodiments.

FIG. 7 shows a block diagram of a video encoding apparatus based on coding units of a tree structure 100, according to an embodiment of the present disclosure.

The video encoding apparatus involving video prediction based on coding units of the tree structure 100 includes an LCU splitter 110, a coding unit determiner 120 and an output unit 130. Hereinafter, for convenience of description, the video encoding apparatus involving video prediction based on coding units of the tree structure 100 is referred to as the 'video encoding apparatus 100'.

The LCU splitter 110 may split a current picture based on a LCU that is a coding unit having a maximum size for a current picture of an image. If the current picture is larger than the LCU, image data of the current picture may be split into the at least one LCU. The LCU according to an embodiment may be a data unit having a size of 32×32, 64×64, 128×128, 256×256, etc., wherein a shape of the data unit is a square having a width and length in squares of 2. The image data may be output to the coding unit determiner 120 according to the at least one LCU.

A coding unit according to an embodiment may be characterized by a maximum size and a depth. The depth denotes the number of times the coding unit is spatially split from the LCU, and as the depth deepens, deeper coding units according to depths may be split from the LCU to a smallest coding unit. A depth of the largest coding unit may be defined as an uppermost depth and a depth of the smallest coding unit may be defined as a lowermost depth. Since a size of a coding unit corresponding to each depth decreases as the depth of the LCU deepens, a coding unit corresponding to an upper depth may include a plurality of coding units corresponding to lower depths.

As described above, the image data of the current picture is split into the LCUs according to a maximum size of the coding unit, and each of the LCUs may include deeper coding units that are split according to depths. Since the LCU according to an embodiment is split according to depths, the image data of a spatial domain included in the LCU may be hierarchically classified according to depths.

A maximum depth and a maximum size of a coding unit, which limit the total number of times a height and a width of the LCU are hierarchically split, may be predetermined.

The coding unit determiner 120 encodes at least one split region obtained by splitting a region of the LCU according to depths, and determines a depth to output a final encoding result according to the at least one split region. That is, the coding unit determiner 120 determines a depth by encoding the image data in the deeper coding units according to depths, according to the LCU of the current picture, and selecting a depth having the least encoding error. The determined depth and image data according to LCUs are output to the output unit 130.

The image data in the LCU is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one depth may be selected for each LCU.

The size of the LCU is split as a coding unit is hierarchically split according to depths, and as the number of coding units increases. Also, even if coding units correspond to the same depth in one LCU, it is determined whether to split each of the coding units corresponding to the same depth to a lower depth by measuring an encoding error of the image data of the each coding unit, separately. Accordingly, even when image data is included in one LCU, the encoding errors may differ according to regions in the one LCU, and thus the depths may differ according to regions in the image data. Thus, one or more depths may be determined in one LCU, and the image data of the LCU may be divided according to coding units of at least one depth.

Accordingly, the coding unit determiner 120 according to an embodiment may determine coding units having a tree structure included in a current LCU. The 'coding units having a tree structure' according to an embodiment include coding units corresponding to a depth determined to be the depth, from among all deeper coding units included in the current LCU. A coding unit of a depth may be hierarchically determined according to depths in the same region of the LCU, and may be independently determined in different regions. Equally, a depth in a current region may be independently determined from a depth in another region.

A maximum depth according to an embodiment is an index related to the number of splitting times from a LCU to a smallest coding unit. A first maximum depth according to an embodiment may denote the total number of splitting times from the LCU to the smallest coding unit. A second maximum depth according to an embodiment may denote the total number of depth levels from the LCU to the smallest coding unit. For example, when a depth of the LCU is 0, a depth of a coding unit, in which the LCU is split once, may be set to 1, and a depth of a coding unit, in which the LCU is split twice, may be set to 2. Here, if the smallest coding unit is a coding unit in which the LCU is split four times, depth levels of depths 0, 1, 2, 3, and 4 exist, and thus the first maximum depth may be set to 4, and the second maximum depth may be set to 5.

Prediction encoding and transformation may be performed according to the LCU. The prediction encoding and the transformation are also performed based on the deeper coding units according to a depth equal to or depths less than the maximum depth, according to the LCU.

Since the number of deeper coding units increases whenever the LCU is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one LCU.

The video encoding apparatus 100 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the LCU, the prediction encoding may be performed based on a coding unit of a depth, i.e., based on the coding unit that is no longer split. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode may selectively include symmetrical partitions obtained by symmetrically splitting a height or width of the prediction unit, partitions obtained by asymmetrically splitting the height or width of the prediction unit, such as 1:n or n:1, partitions obtained by geometrically splitting the prediction unit, or partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, thereby selecting a prediction mode having a least encoding error.

The video encoding apparatus 100 according to an embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Encoding information according to depths requires not only information about a depth but also requires information related to prediction and transformation. Accordingly, the coding unit determiner 120 may determine not only a depth generating a least encoding error but may also determine a partition mode in which a prediction unit is split to partitions, a prediction mode according to prediction units, and a size of a transformation unit for transformation.

Coding units according to a tree structure in a LCU and methods of determining a prediction unit/partition, and a transformation unit, according to embodiments, will be described in detail later with reference to FIGS. 7 through 19.

The coding unit determiner 120 may measure an encoding error of deeper coding units according to depths by using Rate-Distortion Optimization based on Lagrangian multipliers.

The output unit 130 outputs, in bitstreams, the image data of the LCU, which is encoded based on the at least one depth determined by the coding unit determiner 120, and encoding mode information according to depths.

The encoded image data may correspond to a result obtained by encoding residual data of an image.

The encoding mode information according to depths may include depth information, partition mode information of the prediction unit, prediction mode information, and size information of the transformation unit.

Depth information may be defined by using split information according to depths, which specifies whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units of a tree structure are determined for one LCU, and at least one piece of encoding mode information has to be determined for a coding unit of a depth, at least one piece of encoding mode information may be determined for one LCU. Also, a depth of data of the LCU may vary according to locations since the data is hierarchically split according to depths, and thus split information may be set for the data.

Accordingly, the output unit 130 according to an embodiment may assign split information to at least one of the coding unit, the prediction unit, and a minimum unit included in the LCU.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the LCU.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 130 may encode and output SAO parameters related to the SAO parameter encoding method described above with reference to FIGS. 1A through 14.

According to the simplest embodiment for the video encoding apparatus 100, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each LCU, based on the size of the LCU and the maximum depth determined considering characteristics of the current picture. Also, since encoding may be performed on each LCU by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The video encoding apparatus 100 of FIG. 7 may perform the operations of the SAO encoding apparatus 10 described above with reference to FIGS. 1A through 6.

Figure 8:
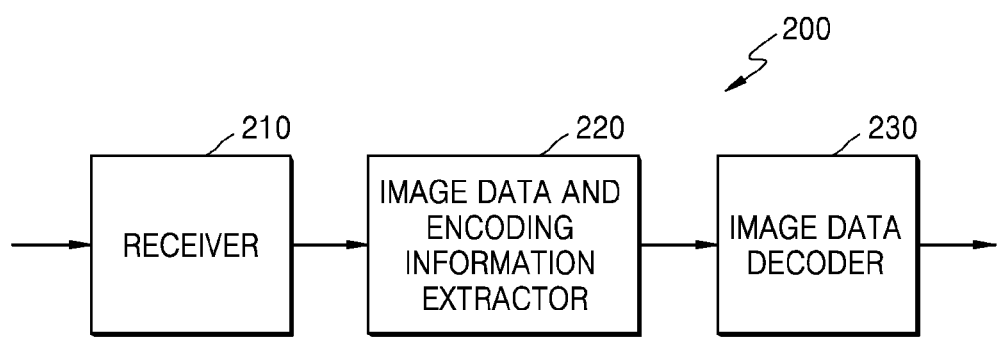
FIG. 8 shows a block diagram of a video decoding apparatus based on coding units of a tree structure, according to various embodiments.

FIG. 8 shows a block diagram of a video decoding apparatus based on coding units of a tree structure 200, according to an embodiment of the present disclosure.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and information about various encoding modes for decoding operations by the video decoding apparatus 200 according to the embodiment are identical to those described with reference to FIG. 15 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each LCU, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts, from the parsed bitstream, split information and encoding information about the coding units having a tree structure according to each LCU. The extracted split information and the extracted encoding information are output to the image data decoder 230. That is, the image data in a bit stream is split into the LCU so that the image data decoder 230 may decode the image data for each LCU.

Split information and encoding information according to each of the LCUs may be set for one or more pieces of split information, and encoding information according to depths may include partition mode information of a corresponding coding unit, prediction mode information, and split information of a transformation unit. Also, as final depth information, the split information according to depths may be extracted.

The split information and encoding information according to each of the LCUs extracted by the image data and encoding information extractor 220 are split information and encoding information determined to generate a minimum encoding error when an encoder, such as the video encoding apparatus 100, repeatedly performs encoding for each deeper coding unit according to depths according to each LCU. Accordingly, the video decoding apparatus 200 may reconstruct an image by decoding data according to an encoding method that generates the minimum encoding error.

Since the split information and the encoding information according to an embodiment may be assigned to a predetermined data unit from among a corresponding coding unit, a prediction unit, and a minimum unit, the image data and encoding information extractor 220 may extract the split information and the encoding information according to the predetermined data units. If split information and encoding information of a corresponding LCU are recorded according to each of the predetermined data units, predetermined data units having the same depth and the split information may be inferred to be the data units included in the same LCU.

The image data decoder 230 reconstructs the current picture by decoding the image data in each LCU based on split information and encoding information according to each of the LCUs. That is, the image data decoder 230 may decode the encoded image data, based on a read partition mode, a prediction mode, and a transformation unit for each coding unit from among the coding units having the tree structure included in each LCU. A decoding process may include a prediction process including intra prediction and motion compensation, and an inverse transformation process.

The image data decoder 230 may perform intra prediction or motion compensation according to a partition and a prediction mode of each coding unit, based on the information about the partition type and the prediction mode of the prediction unit of the coding unit according to depths.

In addition, for inverse transformation for each LCU, the image data decoder 230 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 230 may determine a final depth of a current LCU by using split information according to depths. If the split information specifies that image data is no longer split in the current depth, the current depth is the final depth. Accordingly, the image data decoder 230 may decode the image data of the current LCU by using the information about the partition mode of the prediction unit, the prediction mode, and the split information of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Furthermore, the video decoding apparatus 200 of FIG. 8 may perform the operations of the SAO decoding apparatus 20 described above with reference to FIG. 2A.

Figure 9:
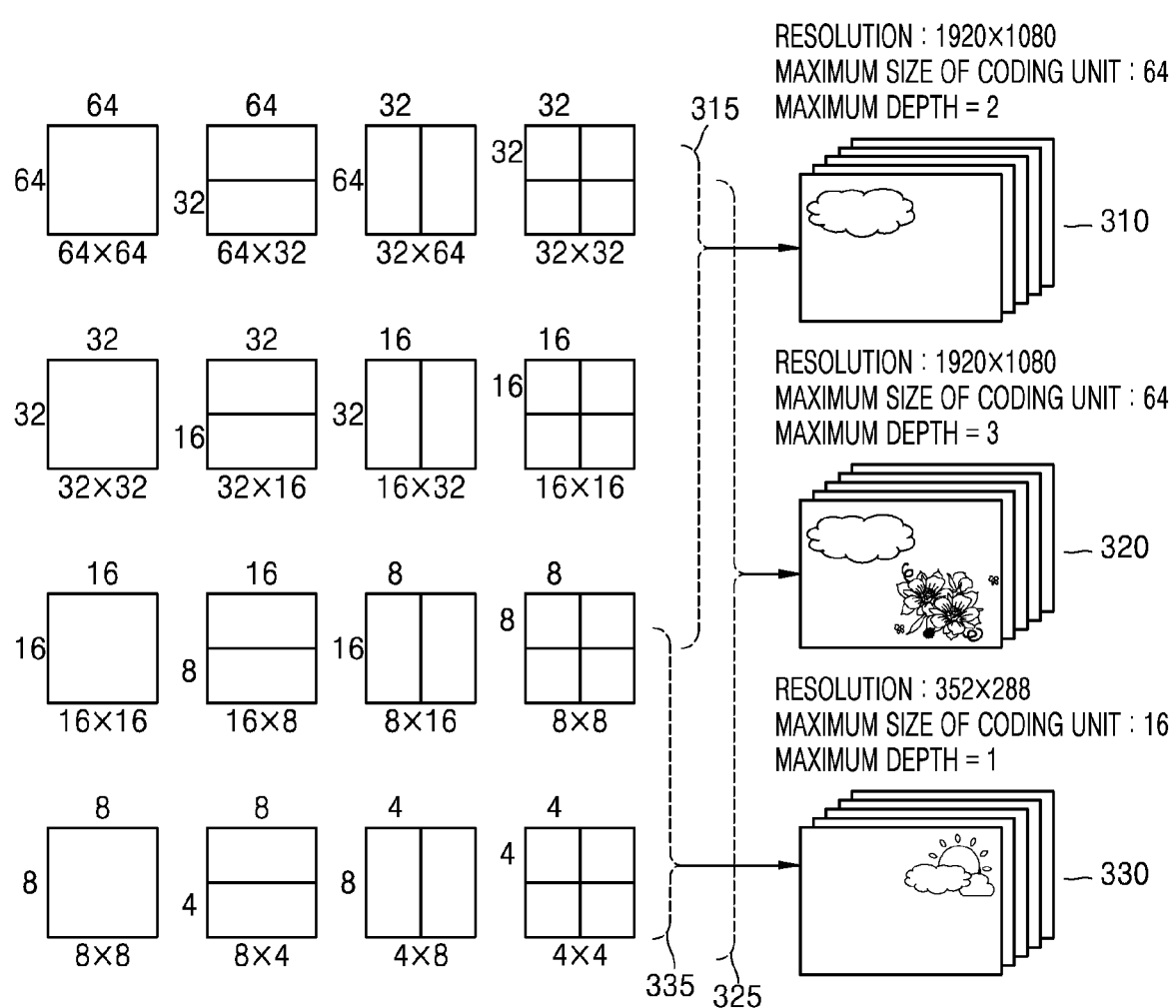
FIG. 9 illustrates a concept of coding units, according to various embodiments.

FIG. 9 illustrates a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 17 denotes the total number of splits from a LCU to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the vide data 310 may include a LCU having a long axis size of 64, and coding units having long axis sizes of 32 and 16 since depths are deepened to two layers by splitting the LCU twice. On the other hand, since the maximum depth of the video data 330 is 1, coding units 335 of the video data 330 may include a LCU having a long axis size of 16, and coding units having a long axis size of 8 since depths are deepened to one layer by splitting the LCU once.

Since the maximum depth of the video data 320 is 3, coding units 325 of the video data 320 may include a LCU having a long axis size of 64, and coding units having long axis sizes of 32, 16, and 8 since the depths are deepened to 3 layers by splitting the LCU three times. As a depth deepens, an expression capability with respect to detailed information may be improved.

Figure 10:
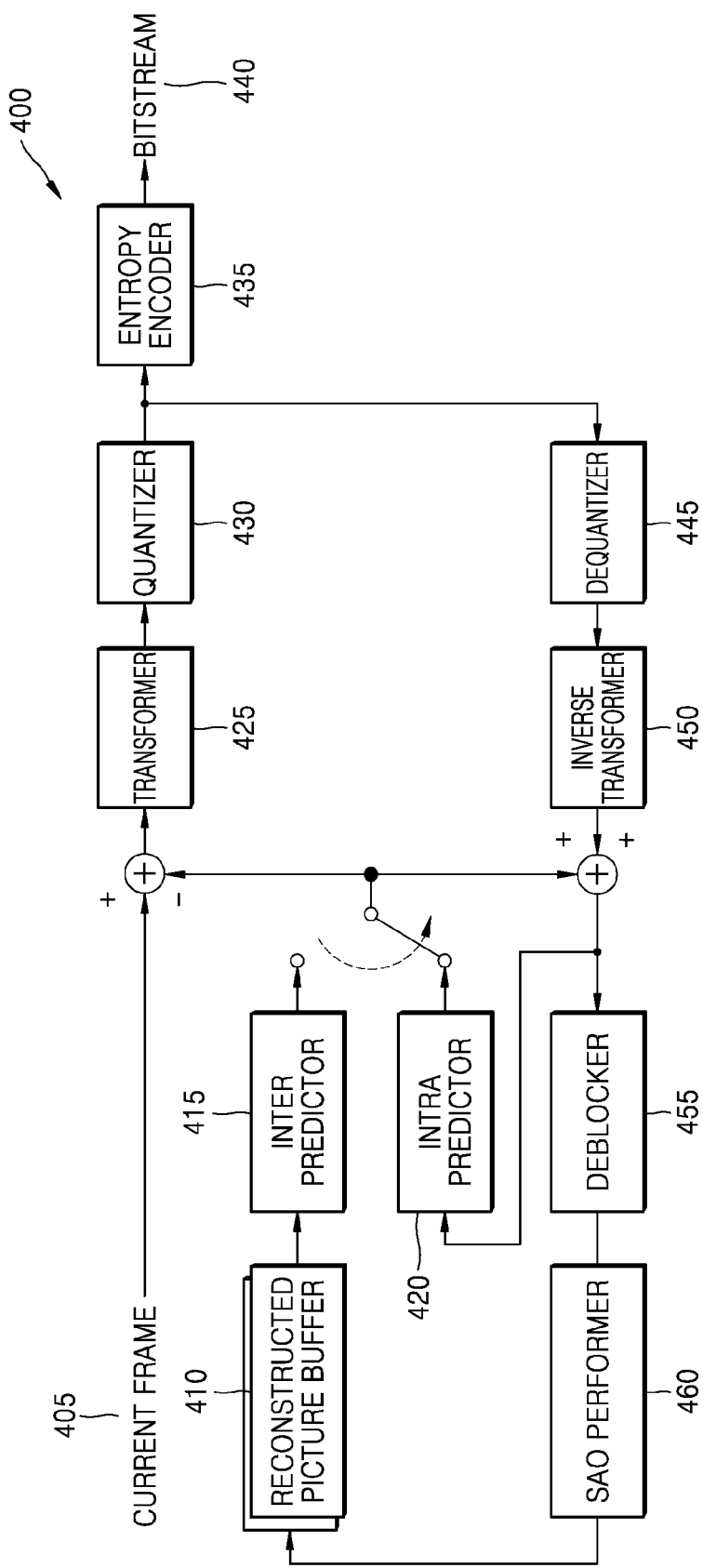
FIG. 10 shows a block diagram of an image encoder based on coding units, according to various embodiments.

FIG. 10 shows a block diagram of an image encoder 400 based on coding units, according to various embodiments.

The image encoder 400 according to an embodiment performs operations of a picture encoder 120 of the video encoding apparatus 100 so as to encode image data. That is, an intra predictor 420 performs intra prediction on coding units in an intra mode, from among a current image 405, and an inter predictor 415 performs inter prediction on coding units in an inter mode by using the current image 405 and a reference image obtained from a reconstructed picture buffer 410 according to prediction units. The current image 405 may be split into LCUs and then the LCUs may be sequentially encoded. In this regard, the LCUs that are to be split into coding units having a tree structure may be encoded.

Residue data is generated by subtracting prediction data regarding a coding unit of each mode which is output from the intra predictor 420 or the inter predictor 415 from data regarding an encoded coding unit of the current image 405, and the residue data is output as a quantized transformation coefficient according to transformation units through a transformer 425 and a quantizer 430. The quantized transformation coefficient is reconstructed as the residue data in a spatial domain through an inverse-quantizer 445 and an inverse-transformer 450. The reconstructed residual image data in the spatial domain is added to prediction data for the coding unit of each mode which is output from the intra predictor 420 or the inter predictor 415 and thus is reconstructed as data in a spatial domain for a coding unit of the current image 405. The reconstructed data in the spatial domain is generated as a reconstructed image through a de-blocking unit 455 and an SAO performer 460 and the reconstructed image is stored in the reconstructed picture buffer 410. The reconstructed images stored in the reconstructed picture buffer 410 may be used as reference images for inter predicting another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the inverse-quantizer 445, the inverse-transformer 450, the de-blocking unit 455, and the SAO performer 460, may perform operations based on each coding unit among coding units having a tree structure according to each LCU.

In particular, the intra predictor 420 and the inter predictor 415 may determine a partition mode and a prediction mode of each coding unit from among the coding units having a tree structure, by taking into account the maximum size and the maximum depth of a current LCU, and the transformer 425 may determine whether to split a transformation unit according to a quadtree in each coding unit from among the coding units having a tree structure.

Figure 11:
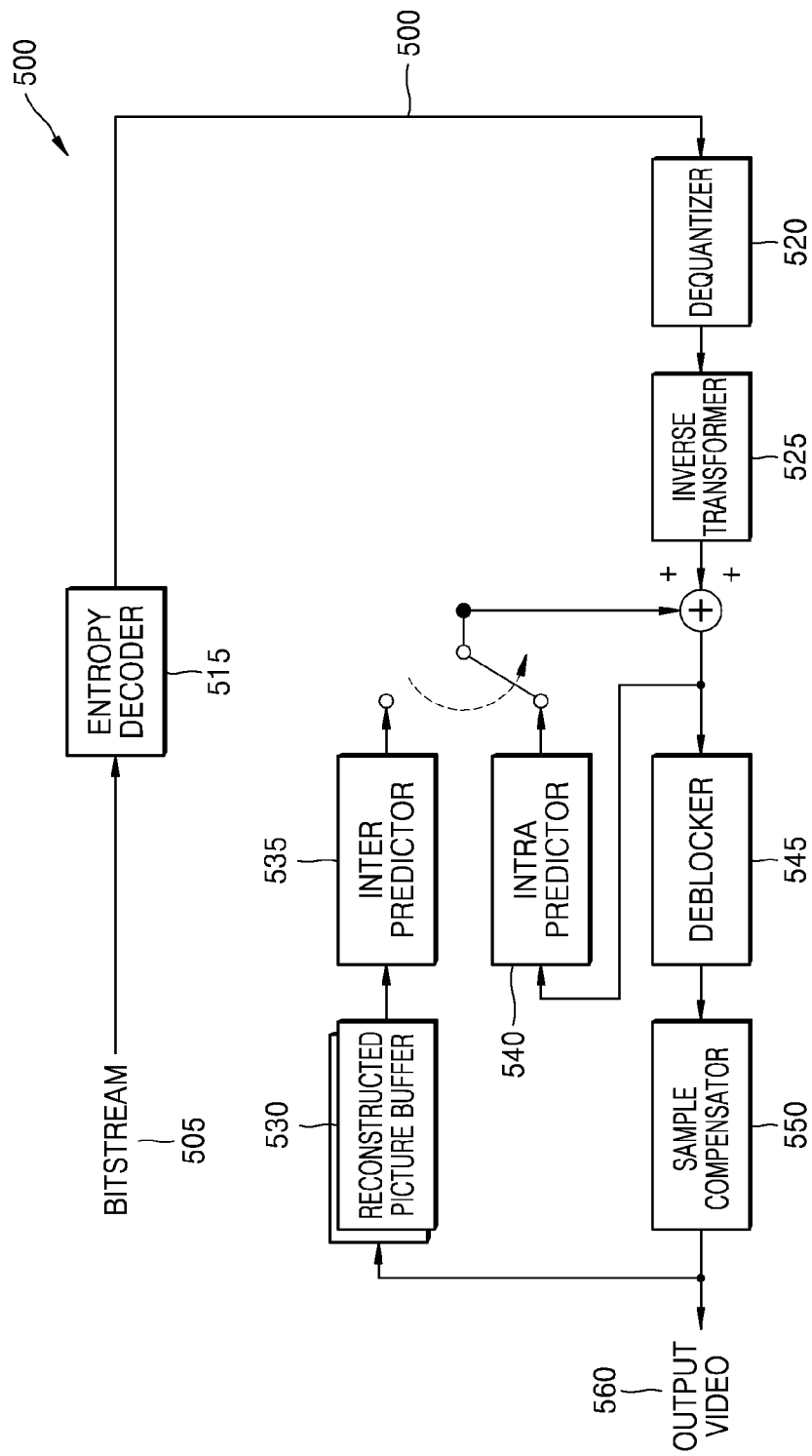
FIG. 11 shows a block diagram of an image decoder based on coding units, according to various embodiments.

FIG. 11 shows a block diagram of an image decoder 500 based on coding units, according to various embodiments.

An entropy decoder 515 parses, from a bitstream 505, encoded image data to be decoded and encoding information required for decoding. The encoded image data corresponds to a quantized transformation coefficient, and an inverse-quantizer 520 and an inverse-transformer 525 reconstruct residue data from the quantized transformation coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 or the inter predictor 535, are summed, so that data in a spatial domain regarding coding units of the current image 405 may be reconstructed, and the reconstructed data in the spatial domain may be output as a reconstructed image 560 through a de-blocking unit 545 and a sample compensator 550. Reconstructed images stored in the reconstructed picture buffer 530 may be output as reference images.

In order for a picture decoder 230 of the video decoding apparatus 200 to decode the image data, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the inverse-quantizer 520, the inverse-transformer 525, the intra predictor 540, the inter predictor 535, the de-blocking unit 545, and the sample compensator 550 may perform operations based on coding units having a tree structure for each LCU.

In particular, the intra predictor 540 and the inter predictor 535 may determine a partition mode and a prediction mode of each coding unit from among the coding units according to a tree structure, and the inverse-transformer 525 may determine whether or not to split a transformation unit according to a quadtree in each coding unit.

Figure 12:
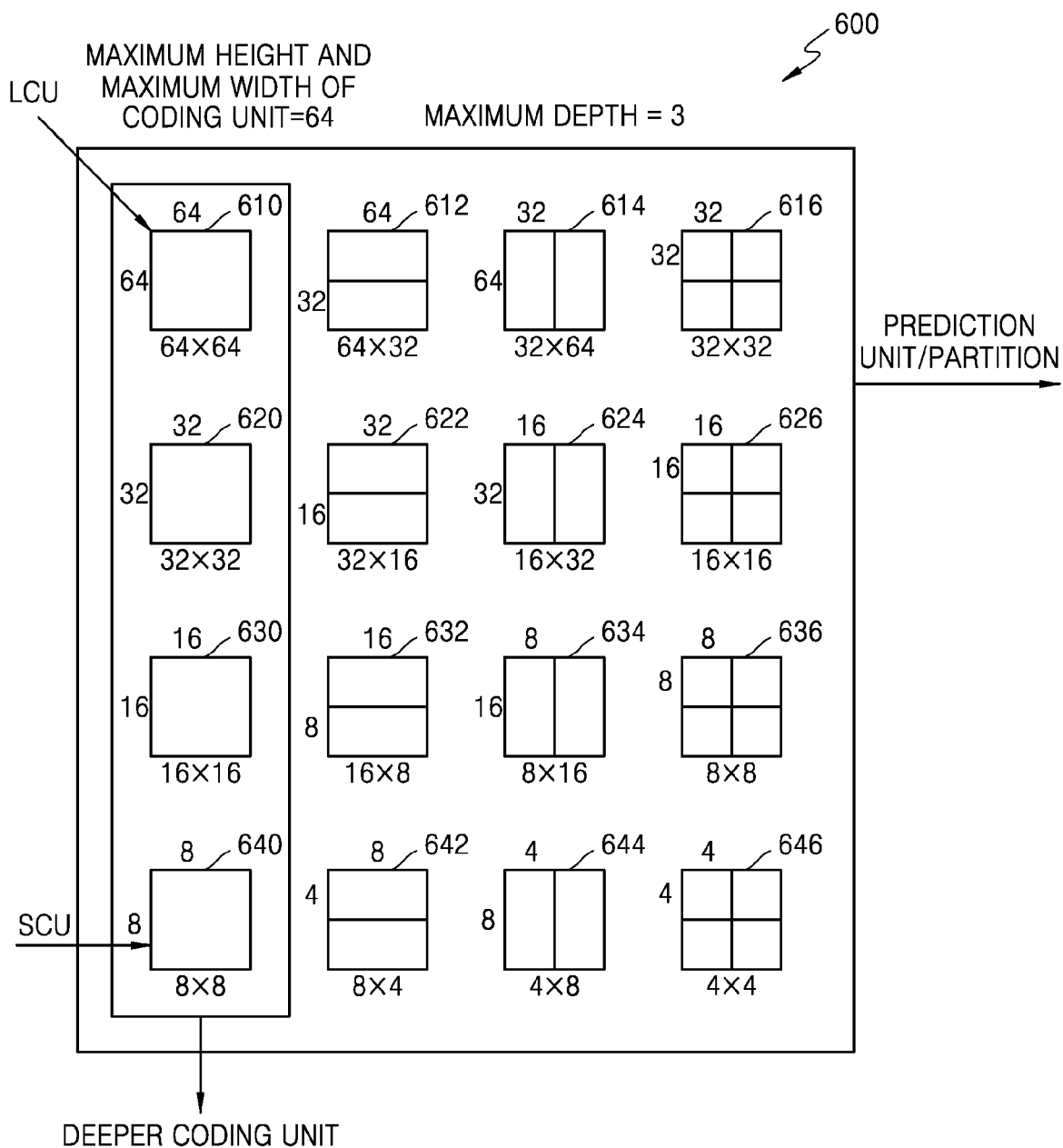
FIG. 12 shows deeper coding units according to depths, and partitions, according to various embodiments.

FIG. 12 shows deeper coding units according to depths, and partitions, according to an embodiment of the present disclosure.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 3. In this case, the maximum depth represents a total number of times the coding unit is split from the LCU to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is a LCU in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a smallest coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having the size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having the size of 16×16, i.e. a partition 630 having a size of 16×16, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having the size of 8×8, i.e. a partition 640 having a size of 8×8, partitions 642 having a size of 8×4, partitions 644 having a size of 4×8, and partitions 646 having a size of 4×4.

In order to determine a final depth of the LCU 610, the coding unit determiner 120 of the video encoding apparatus 100 has to perform encoding on coding units respectively corresponding to depths included in the LCU 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth deepens along the vertical axis of the hierarchical structure of coding units 600. A depth and a partition generating the minimum encoding error in the LCU 610 may be selected as a final depth and a partition mode of the LCU 610.

Figure 13:
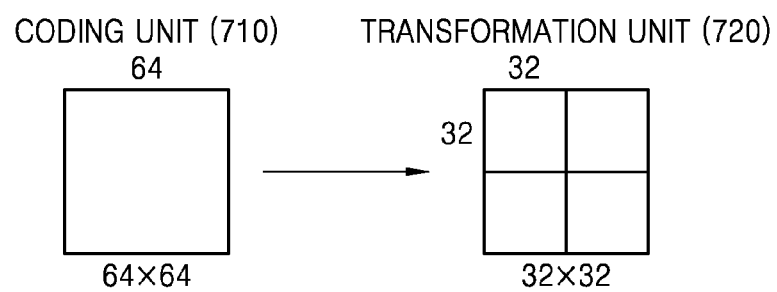
FIG. 13 illustrates a relationship between a coding unit and transformation units, according to various embodiments.

FIG. 13 illustrates a relationship between a coding unit and transformation units, according to an embodiment of the present disclosure.

The video encoding apparatus 100 according to an embodiment or the video decoding apparatus 200 according to an embodiment encodes or decodes an image according to coding units having sizes smaller than or equal to a LCU for each LCU. Sizes of transformation units for transformation during an encoding process may be selected based on data units that are not larger than a corresponding coding unit.

For example, in the video encoding apparatus 100 or the video decoding apparatus 200, when a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 14:
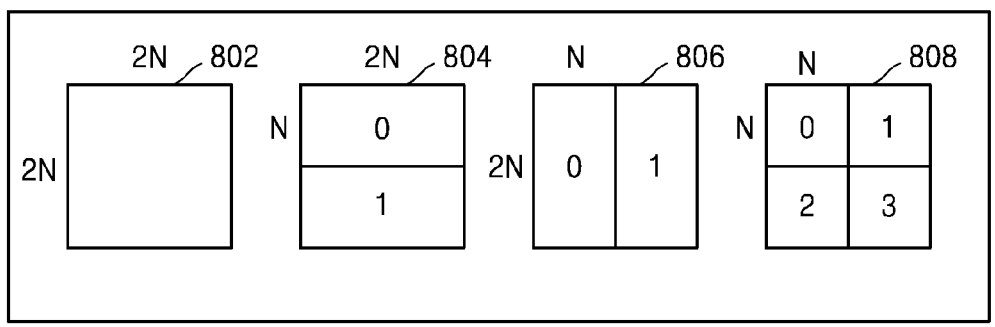
FIG. 14 shows a plurality of pieces of encoding information according to depths, according to various embodiments.
Figure 14:
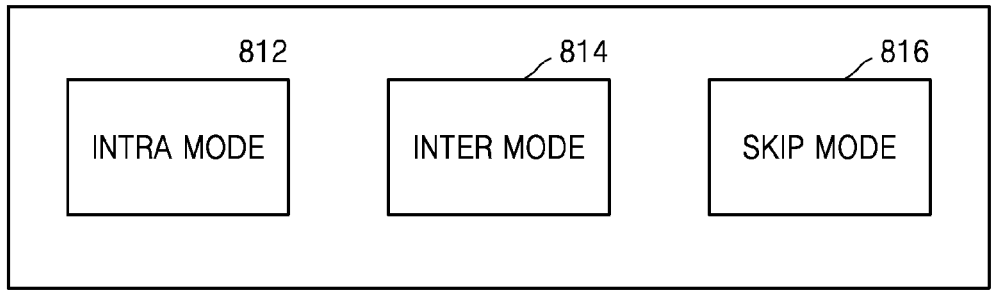
Figure 14:
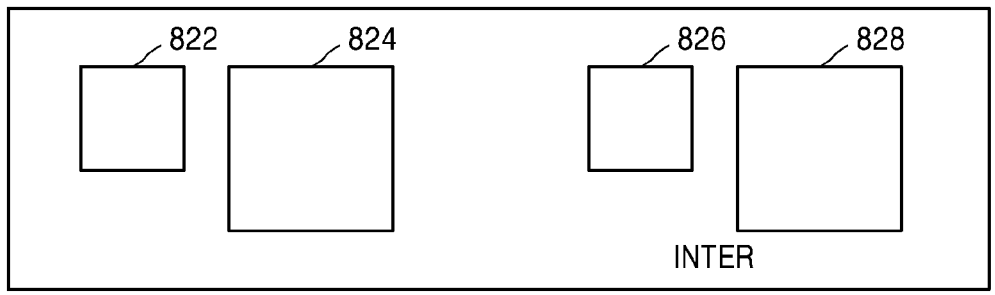

FIG. 14 shows a plurality of pieces of encoding information, according to an embodiment of the present disclosure.

The output unit 130 of the video encoding apparatus 100 according to an embodiment may encode and transmit, as encoding mode information, partition mode information 800, prediction mode information 810, and transformation unit size information 820 for each coding unit corresponding to a final depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

In addition, the transformation unit size information 820 represents a transformation unit to be based on when transformation is performed on a current coding unit. For example, the transformation unit may be one of a first intra transformation unit size 822, a second intra transformation unit size 824, a first inter transformation unit size 826, and a second inter transformation unit size 828.

The image data and encoding information extractor 210 of the video decoding apparatus 200 may extract and use the partition mode information 800, the prediction mode information 810, and the transformation unit size information 820 for decoding, according to each deeper coding unit.

Figure 15:
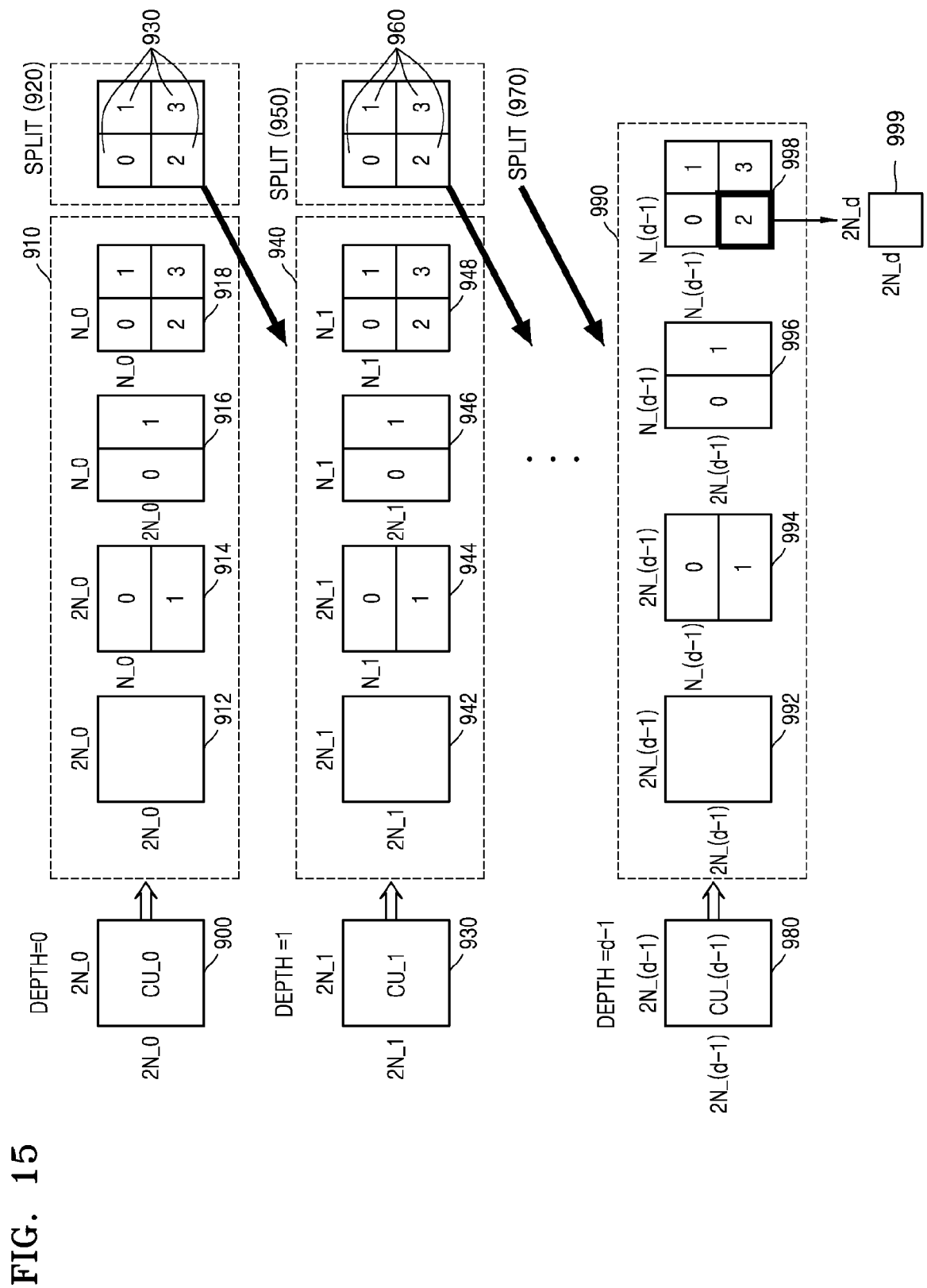
FIG. 15 shows deeper coding units according to depths, according to various embodiments.

FIG. 15 shows deeper coding units according to depths, according to an embodiment of the present disclosure.

Split information may be used to represent a change in a depth. The spilt information specifies whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0× N_0, a partition mode 916 having a size of N_0×2N_0, and a partition mode 918 having a size of N_0×N_0. Only the partition modes 912, 914, 916, and 918 which are obtained by symmetrically splitting the prediction unit are shown, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 1610 may not be split into a lower depth.

If the encoding error is the smallest in the partition mode 918 having the size of N_0×N_0, a depth is changed from 0 to 1 and split is performed (operation 920), and encoding may be repeatedly performed on coding units 930 of a partition mode having a depth of 2 and a size of N_0×N_0 so as to search for a minimum encoding error.

A prediction unit 930 for prediction encoding the coding unit 930 having a depth of 1 and a size of 2N_1×2N_1 (=N_0×N_0) may include a partition mode 942 having a size of 2N_1×2N_1, a partition mode 944 having a size of 2N_1×N_1, a partition mode 946 having a size of N_1× 2N_1, and a partition mode 948 having a size of N_1×N_1.

If an encoding error is the smallest in the partition mode 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current LCU 900 is determined to be d−1 and a partition mode of the current LCU 900 may be determined to be N_(d−1)×N_(d−1). Also, since the maximum depth is d, split information for a coding unit 952 having a depth of d−1 is not set.

A data unit 999 may be a 'minimum unit' for the current LCU. A minimum unit according to the embodiment may be a square data unit obtained by splitting a smallest coding unit having a lowermost depth by 4. By performing the encoding repeatedly, the video encoding apparatus 100 according to the embodiment may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as encoding mode information. Also, since a coding unit has to be split from a depth of 0 to a depth, only split information of the depth is set to '0', and split information of depths excluding the depth is set to '1'.

The image data and encoding information extractor 220 of the video decoding apparatus 200 according to the embodiment may extract and use a depth and prediction unit information about the coding unit 900 so as to decode the coding unit 912. The video decoding apparatus 900 according to the embodiment may determine a depth, in which split information is '0', as a depth by using split information according to depths, and may use, for decoding, encoding mode information about the corresponding depth.

Figure 16:
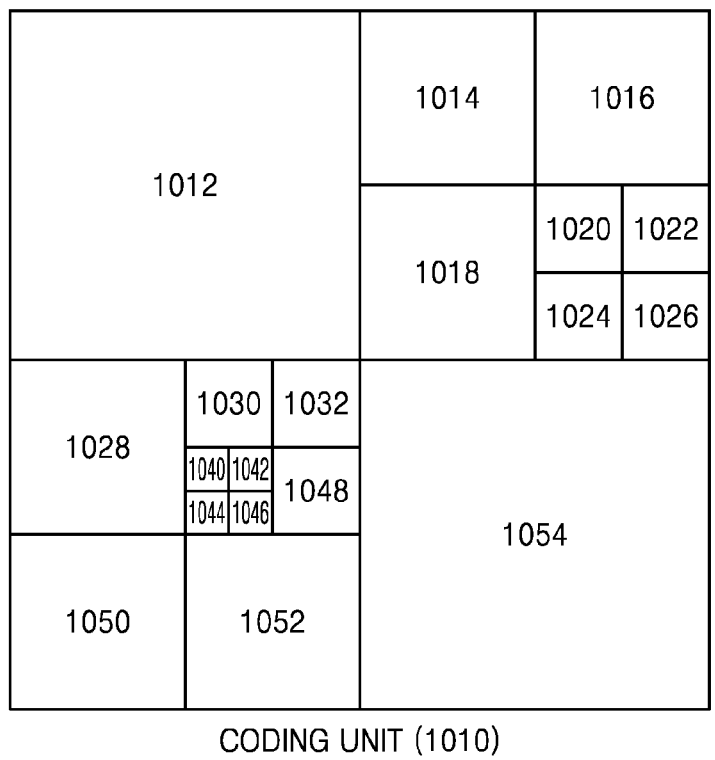
FIGS. 16, 17, and 18 illustrate a relationship between coding units, prediction units, and transformation units, according to various embodiments.
Figure 17:
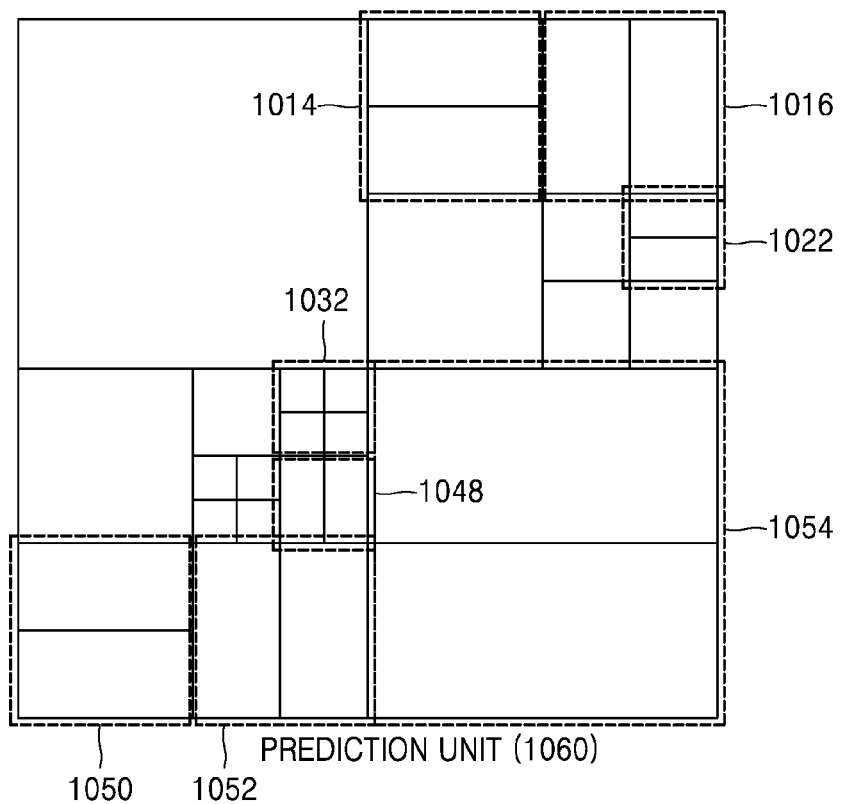
Figure 18:
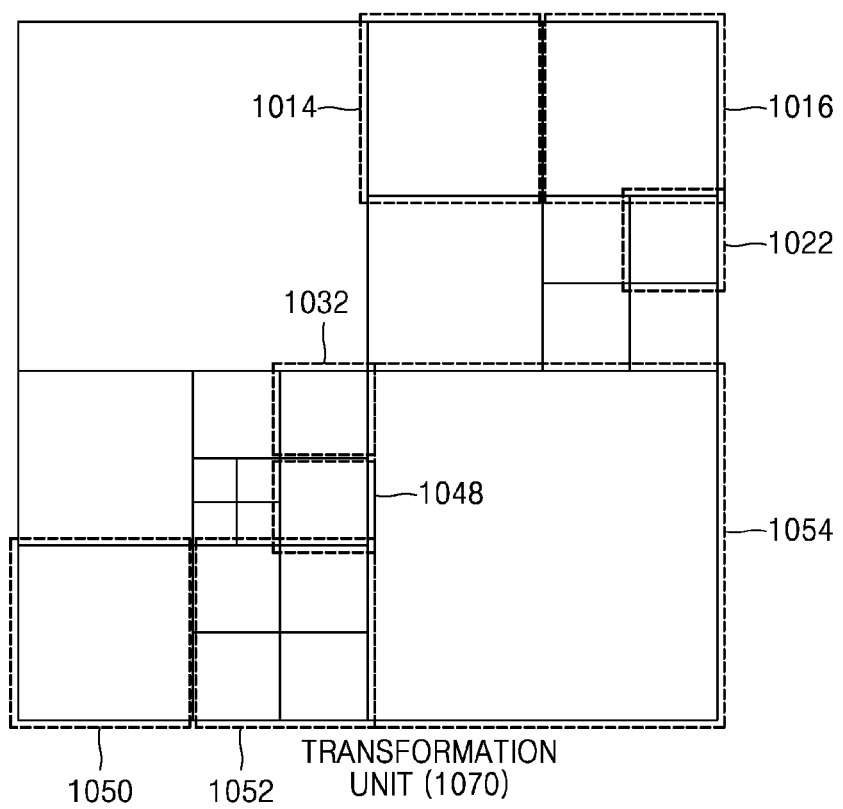

FIGS. 16, 17, and 18 illustrate a relationship between coding units, prediction units, and transformation units, according to an embodiment of the present disclosure.

Coding units 1010 are deeper coding units according to depths determined by the video encoding apparatus 100, in a LCU. Prediction units 1060 are partitions of prediction units of each of the coding units 1010 according to depths, and transformation units 1070 are transformation units of each of the coding units according to depths.

When a depth of a LCU is 0 in the deeper coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by splitting the coding unit. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the deeper coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1060 are data units different from those in the prediction units 1060 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a LCU so as to determine an optimum coding unit, and thus coding units according to a recursive tree structure may be obtained. Encoding information may include split information about a coding unit, partition mode information, prediction mode information, and transformation unit size information. Table 2 below shows the encoding information that may be set by the video encoding apparatus 100 and the video decoding apparatus 200 according to the embodiments.

is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

TABLE 2

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | Repeatedly Encode Coding Units having Lower Depth of d + 1 |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a final depth, and thus partition mode information, prediction mode information, and transformation unit size information may be defined for the final depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That The encoding information about coding units having a tree structure according to the embodiment may be assigned to at least one of a coding unit of a depth, a prediction unit, and a minimum unit. The coding unit of the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a LCU may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 19:
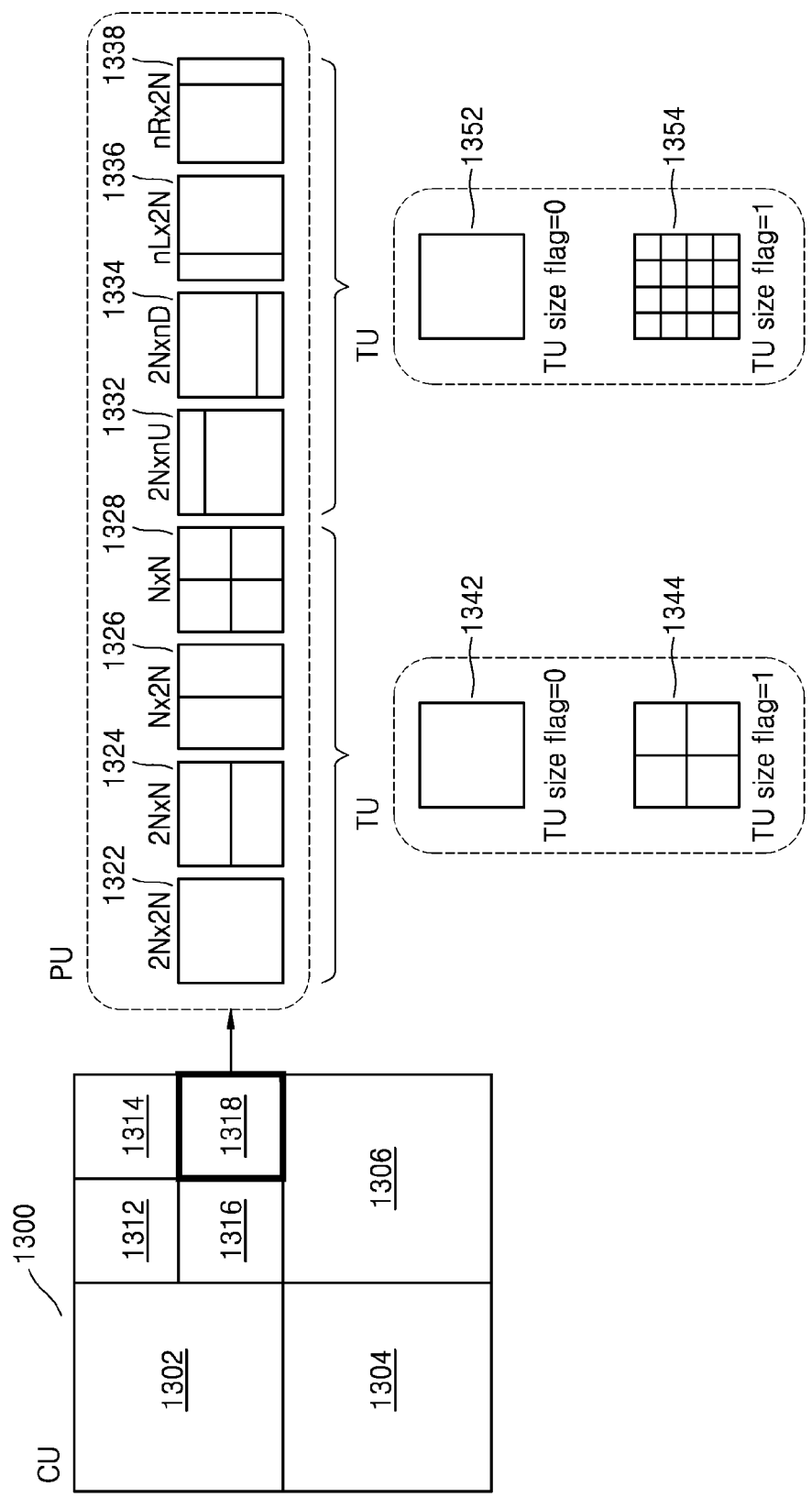
FIG. 19 illustrates a relationship between a coding unit, a prediction unit, and a transformation unit, according to encoding information of Table 2.

FIG. 19 illustrates a relationship between a coding unit, a prediction unit, and a transformation unit, according to the encoding mode information of Table 2.

A LCU 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition mode information is set to be one of asymmetrical partition modes 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 12 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a–1) then the size of a transformation unit may be 32×32 when a TU size flag is 0, (a–2) may be 16×16 when the TU size flag is 1, and (a–3) may be 8×8 when the TU size flag is 2.

As another example, (b) if the size of the current coding unit is 32×32 and a minimum transformation unit size is 32×32, (b–1) then the size of the transformation unit may be 32×32 when the TU size flag is 0. Here, the TU size flag cannot be set to a value other than 0, since the size of the transformation unit cannot be smaller than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 7 through 19, image data of a spatial domain is encoded in each of the coding units of the tree structure, and the image data of the spatial domain is reconstructed in a manner that decoding is performed on each LCU according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

Also, SAO parameters may be signaled with respect to each picture, each slice, each LCU, each of coding units having a tree structure, each prediction unit of the coding units, or each transformation unit of the coding units. For example, pixel values of reconstructed pixels of each LCU may be adjusted by using offset values reconstructed based on received SAO parameters, and thus an LCU having a minimized error between an original block and the LCU may be reconstructed.

For convenience of description, the video encoding method according to adjustment of a sample offset, which is described with reference to FIGS. 1A through 18, will be collectively referred to as 'the video encoding method of the present disclosure'. Also, the video decoding method according to adjustment of a sample offset, which is described with reference to FIGS. 1A through 18, will be collectively referred to as 'the video decoding method of the present disclosure'.

Also, the video encoding apparatus including the SAO encoding apparatus 10, the video encoding apparatus 100 or the image encoder 400, which is described with reference to FIGS. 1A through 18, will be collectively referred to as the 'video encoding apparatus of the present disclosure'. Also, the video decoding apparatus including the SAO decoding apparatus 20, the video decoding apparatus 200, or the image decoder 500, which is described with reference to FIGS. 2A through 19, will be collectively referred to as the 'video decoding apparatus of the present disclosure'.

The computer-readable recording medium such as a disc 26000 that stores the programs according to an embodiment will now be described in detail.

Figure 20:
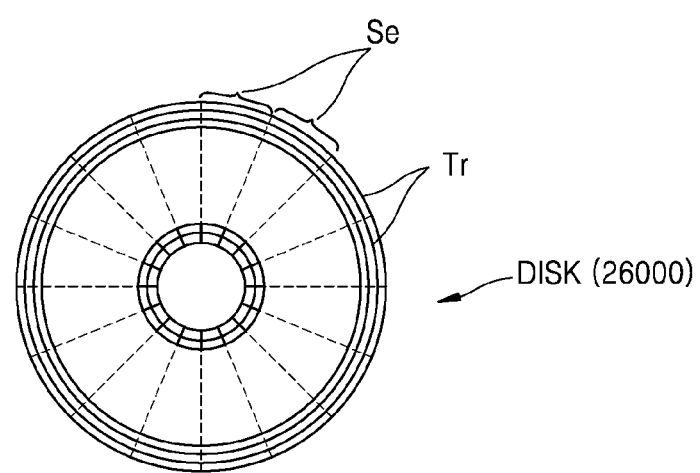
FIG. 20 shows a physical structure of a disc in which a program is stored, according to various embodiments.

FIG. 20 shows a physical structure of the disc 26000 in which a program is stored, according to an embodiment. The disc 26000 described as the storage medium may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using the storage medium that stores the program for executing the video encoding method and the video decoding method as described above will now be described with reference to FIG. 14.

Figure 21:
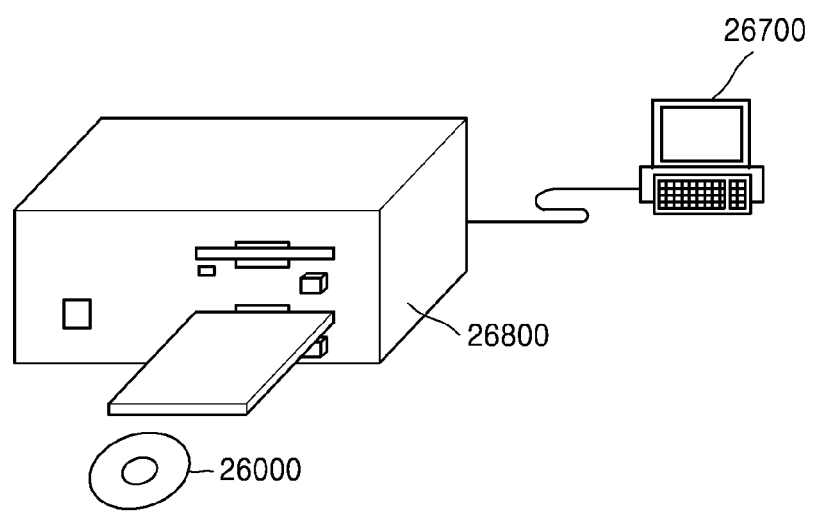
FIG. 21 shows a disc drive for recording and reading a program by using the disc.

FIG. 21 illustrates a disc drive 26800 for recording and reading a program by using the disc 26000. A computer system 26700 may store a program that executes at least one of the video encoding method and the video decoding method of the present disclosure, in the disc 26000 via the disc drive 26800. In order to run the program stored in the disc 26000 in the computer system 26700, the program may be read from the disc 26000 and may be transmitted to the computer system 26700 by using the disc drive 26800.

The program that executes at least one of the video encoding method and the video decoding method of the present disclosure may be stored not only in the disc 26000 illustrated in FIGS. 20 and 21 but may also be stored in a memory card, a ROM cassette, or a solid state drive (SSD).

A system to which the video encoding method and the video decoding method according to the embodiments described above are applied will be described below.

Figure 22:
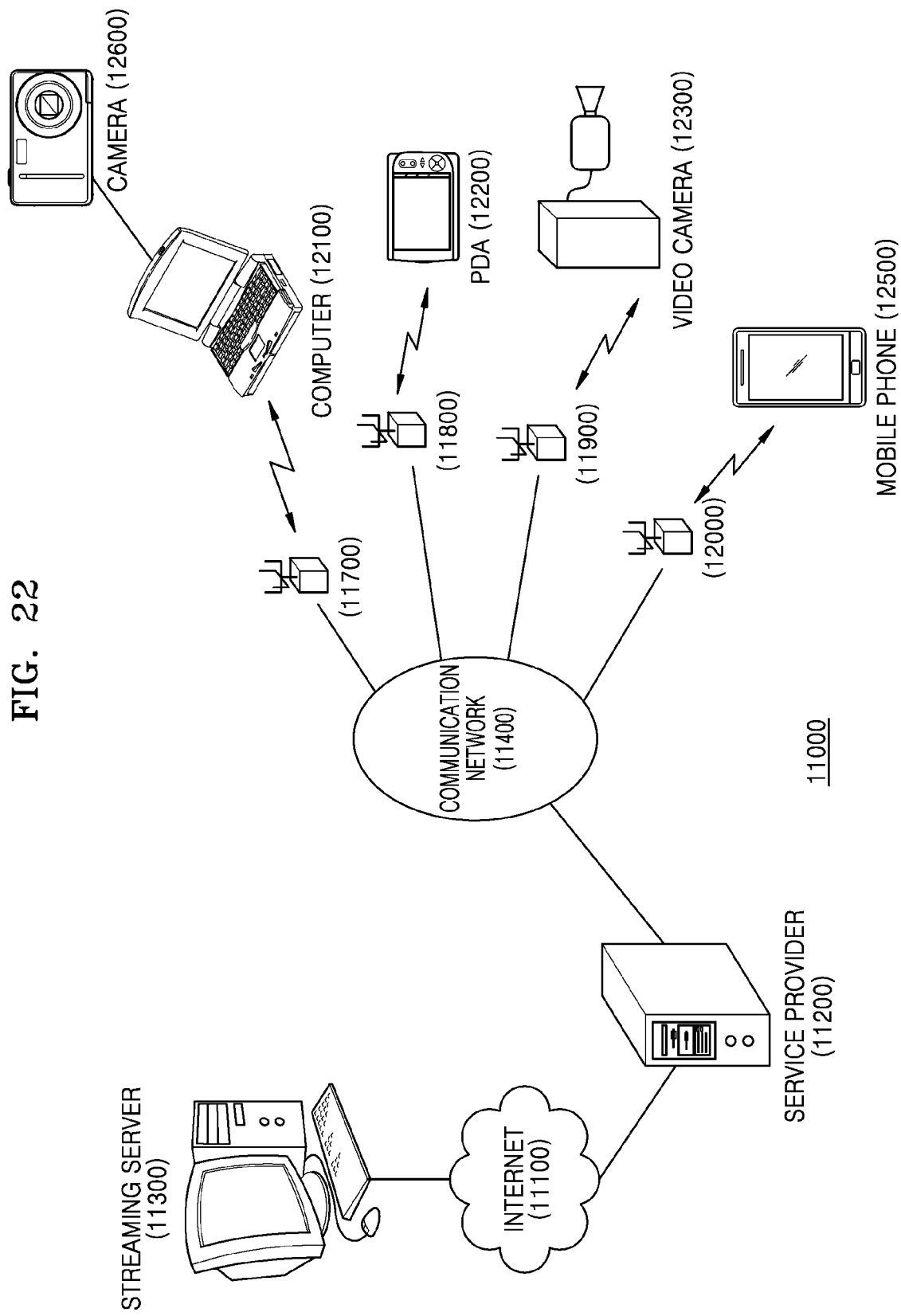
FIG. 22 shows an overall structure of a content supply system for providing a content distribution service.

FIG. 22 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 22, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessed by the computer 12100.

If video is captured by a camera mounted in the mobile phone 12500, video data may be received from the mobile phone 12500.

The video data may be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and may transmit the encoded content data to the streaming server 11300. The streaming server 11300 may transmit the encoded content data in a type of streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

The video encoding apparatus and the video decoding apparatus of the present disclosure may be applied to encoding and decoding operations of the plurality of independent devices included in the content supply system 11000.

Figure 23:
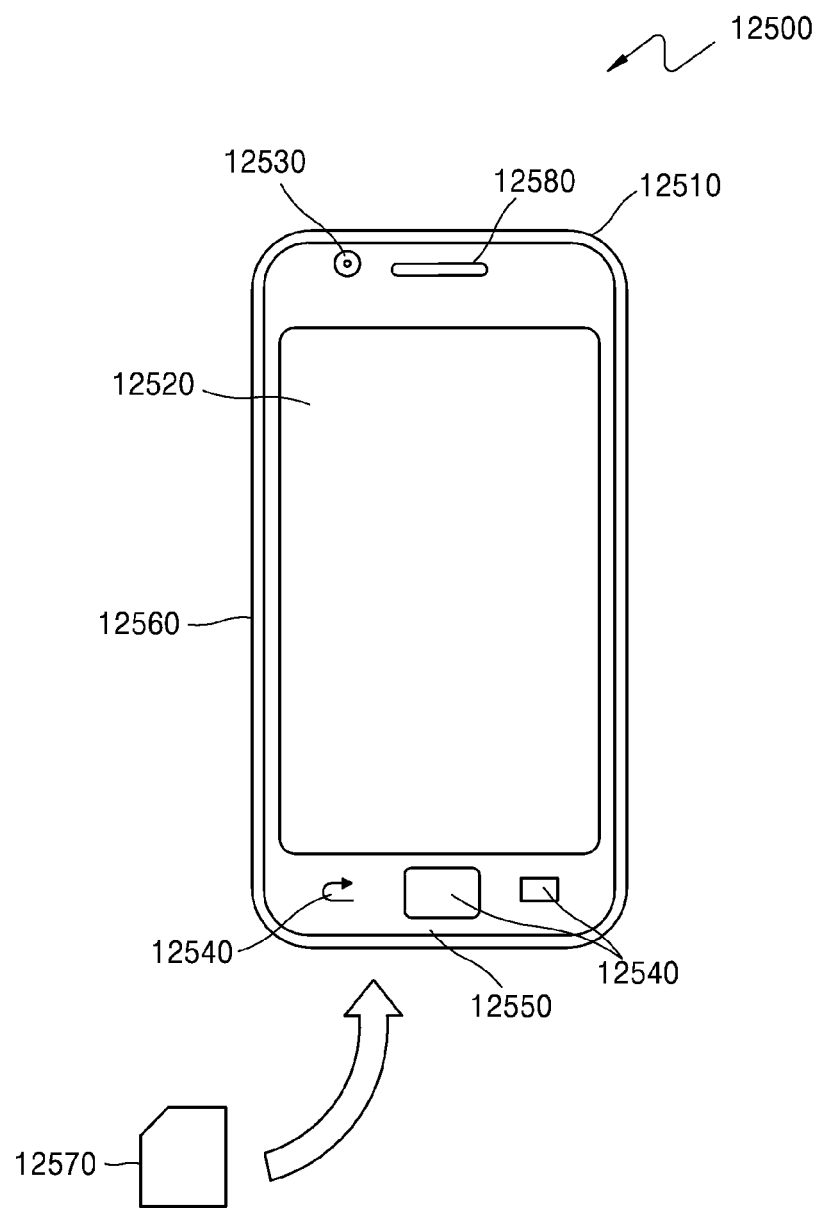
FIGS. 23 and 24 show external and internal structures of a mobile phone to which a video encoding method and a video decoding method of the present disclosure are applied, according to various embodiments.
Figure 24:
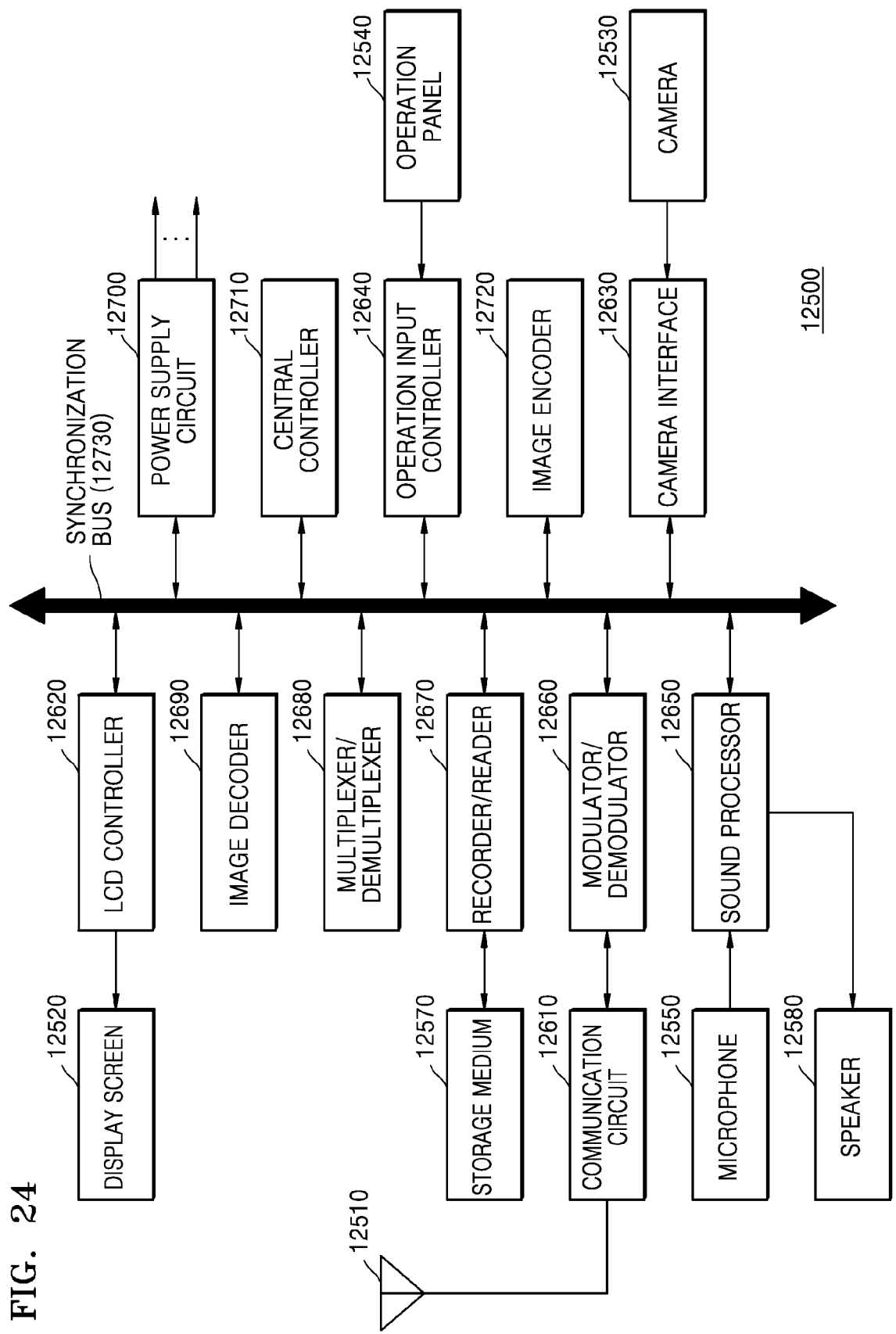

With reference to FIGS. 23 and 24, the mobile phone 12500 included in the content supply system 11000 according to an embodiment will now be described in detail.

FIG. 23 illustrates an external structure of the mobile phone 12500 to which the video encoding apparatus and the video decoding apparatus of the present disclosure are applied, according to an embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 24 illustrates an internal structure of the mobile phone 12500. In order to systemically control each of parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a CPU, a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 by control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650 under control of the central controller 12710. The digital sound signal may be transformed into a transformation signal via the modulator/demodulator 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulator/demodulator 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and analog-to-digital (A/D) conversion are performed on a signal received via the antenna 12510 to transform the signal into a digital signal. The modulator/demodulator 12660 modulates a frequency band of the digital signal. The frequency-band modulated digital signal is transmitted to the image decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and A/D conversion on the amplified signal. A received digital sound signal is transformed into an analog sound signal via the modulator/demodulator 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the image decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method of the present disclosure.

Thus, the video data of the video file accessed at the Internet website may be displayed on the display screen 12520. At the same time, the sound processor 12650 may transform audio data into an analog sound signal, and may provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus of the present disclosure, may be a transmitting terminal including only the video encoding apparatus of the present disclosure, or may be a receiving terminal including only the video decoding apparatus of the present disclosure.

Figure 25:
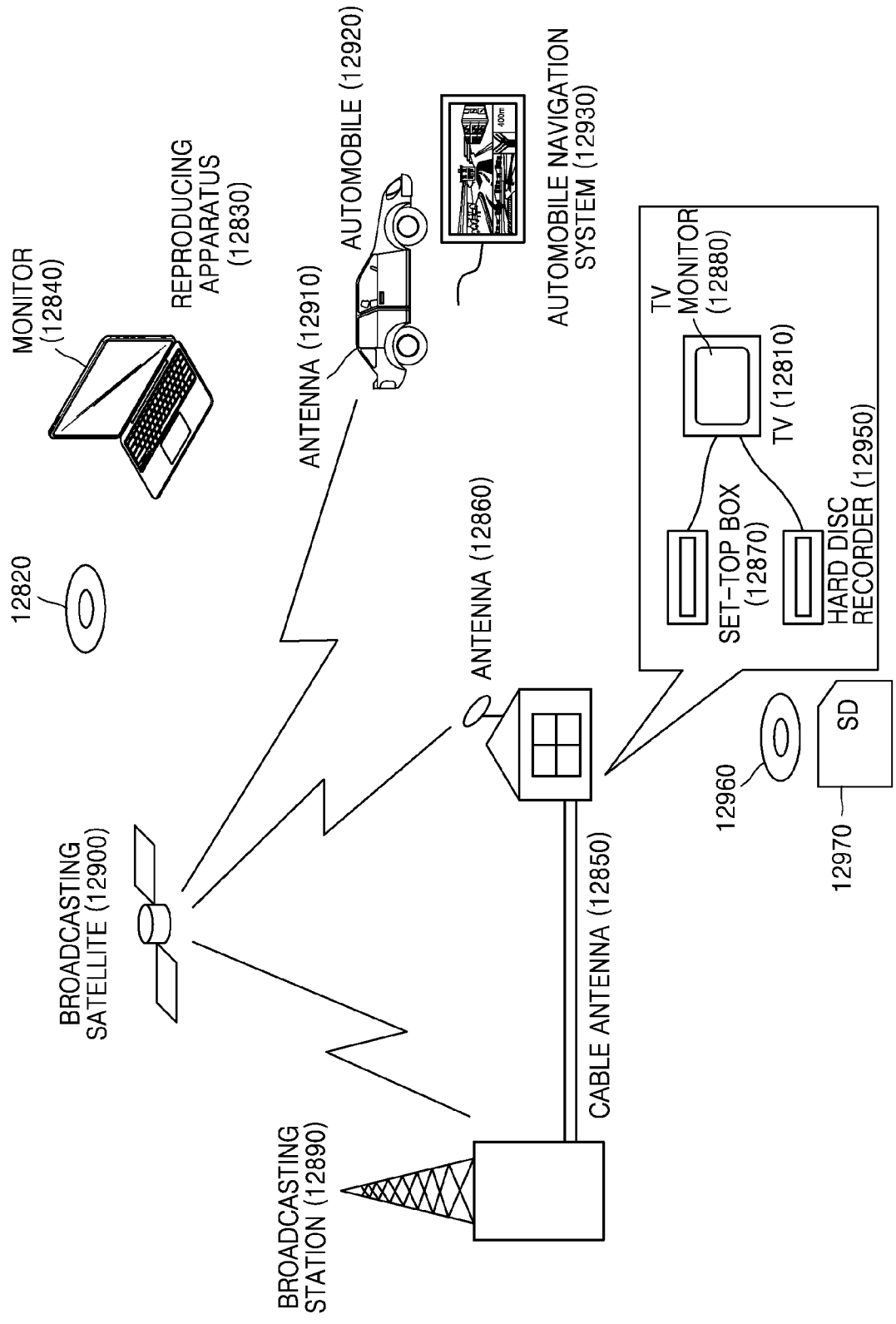
FIG. 25 shows a digital broadcasting system employing a communication system, according to various embodiments.

A communication system of the present disclosure is not limited to the communication system described above with reference to FIG. 22. For example, FIG. 25 shows a digital broadcasting system employing a communication system, according to an embodiment of the present disclosure. The digital broadcasting system of FIG. 25 may receive a digital broadcast transmitted via a satellite or a terrestrial network by using the video encoding apparatus and the video decoding apparatus of the present disclosure.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present disclosure is implemented in a reproducing apparatus 12830, the reproducing apparatus 12830 may parse and decode an encoded video stream recorded on a storage medium 12820 such as a disc or a memory card so as to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present disclosure may be installed. Data output from the set-top box 12870 may also be reproduced on a TV monitor 12880.

As another example, the video decoding apparatus of the present disclosure may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus of the present disclosure and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 24. For example, the computer 12100 and the TV receiver 12810 may not include the camera 12530, the camera interface 12630, and the image encoder 12720 of FIG. 24.

Figure 26:
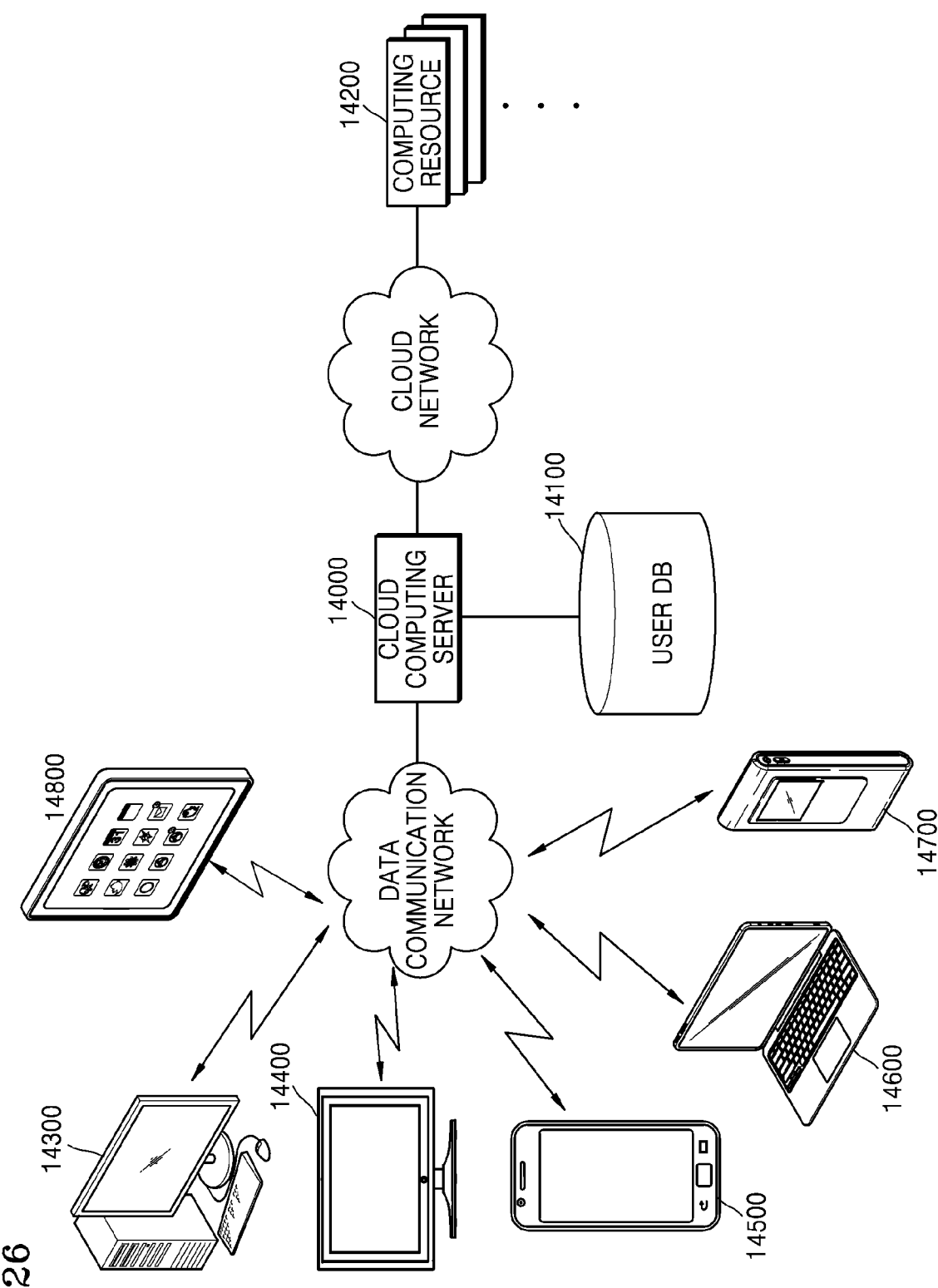
FIG. 26 shows a network structure of a cloud computing system using a video encoding apparatus and a video decoding apparatus, according to various embodiments.

FIG. 26 illustrates a network structure of a cloud computing system using a video encoding apparatus and a video decoding apparatus, according to an embodiment of the present disclosure.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and may provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include log-in information, and personal credit information such as addresses, names, and the like. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 23.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. On the other hand, if the user terminal requests to reproduce the video, starting from the pausing point thereof, the cloud computing server 14000 transmits streaming data of the video starting from a frame corresponding to the pausing point, to the user terminal.

Here, the user terminal may include the video decoding apparatus as described above with reference to FIGS. 1A through 26. As another example, the user terminal may include the video encoding apparatus as described above with reference to FIGS. 1A through 26. Alternatively, the user terminal may include both the video encoding apparatus and the video decoding apparatus as described above with reference to FIGS. 1A through 26.

Various applications of the video encoding method and the video decoding method of the present disclosure, and the video encoding apparatus and the video decoding apparatus of the present disclosure described above with reference to FIGS. 1A through 26 are described above with reference to FIGS. 13 through 19. However, various embodiments of methods of storing the video encoding method and the video decoding method in a storage medium or various embodiments of methods of implementing the video encoding apparatus and the video decoding apparatus in a device described above with reference to FIGS. 1A through 19 are not limited to the embodiments of FIGS. 20 through 26.

As used herein, a technique "A may include one of a1, a2 and a3" is that an element A may include an exemplary element a1, a2, or a3 in a wide sense.

Due to the above-described technique, an element that may be included the element A is not necessarily limited to a1, a2 or a3. Thus, the technique is not exclusively construed that an element that may be included in A excludes other elements that are not exemplified, in addition to a1, a2, and a3.

Further, the technique means that A may include a1, a2, or a3. The technique does not mean that elements included in A are not necessarily selectively determined within a predetermined set. For example, the technique is not limited to construe that a1, a2, or a3 selected from a set including a1, a2, and a3 is necessarily included in the component A.

In addition, in the present specification, a technique "at least one of a1, a2, or (and) a3" means one of a1; a2; a3; a1 and a2; a1 and a3; a2 and a3; and a1 and a2, and a3.

Thus, unless explicitly described as "at least one of a1, at least one of a2, or (and) at least one of a3", the technique "at least one of a1, a2, or (and) a3" is not construed as "at least one of a1, at least one of a2, or (and) at least one of a3".

The embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

While the present disclosure has been particularly shown and described with reference to exemplary embodiments thereof, it will be understood by those of ordinary skill in the art that various changes in form and details may be made therein without departing from the spirit and scope of the following claims. The disclosed embodiments should be considered in a descriptive sense only and not for purposes of limitation. Therefore, the scope of the present disclosure is defined not by the detailed description of the present disclosure but by the appended claims, and all differences within the scope will be construed as being included in the present disclosure.

The invention claimed is:

1. A video encoding method for signaling of sample adaptive offset (SAO) parameters, the video encoding method comprising:
    determining only two bandgroups in thirty two bands to compensate for a pixel sample value of a current block comprised in a video;
    determining bandgroup position information regarding a position of each of the determined two bandgroups, wherein the determined bandgroup position information comprises only two pieces of information regarding two positions of two start bands in the determined two bandgroups and does not comprise information regarding positions of two last bands in the determined two bandgroups;
    determining offsets with respect to bands comprised in each of the determined two bandgroups; and
    generating a bitstream comprising the two pieces of information regarding the two positions of the two start bands in the determined two bandgroups, the determined offsets, and an encoded video,
    wherein a plurality of bands in the two bandgroups are a part of all bands,
    wherein each of the two bandgroups has only two adjacent bands among the thirty two bands,
    wherein sixteen pixel sample values are spanned by each of the two bandgroups, and
    wherein the two bandgroups, apart from each other, are determined without generating any pieces of information regarding positions of bands which do not have an offset to be included in the bitstream.

2. The video encoding method of claim 1, wherein the current block is a largest coding unit (LCU) comprised in the video.

3. A video decoding method for signaling of sample adaptive offset (SAO) parameters, the video decoding method comprising:

obtaining, from a bitstream, offsets with respect to bands comprised in each of two bandgroups in thirty two bands with respect to a current block comprised in a video;

obtaining, from the bitstream, position information regarding the two bandgroups;

determining the two bandgroups to compensate for a pixel sample value of the current block, based on the position information regarding each of the two bandgroups, wherein the position information comprises only two pieces of information regarding two positions of two start bands in the determined two bandgroups and does not comprise information regarding positions of two last bands in the determined two bandgroups; and compensating for a sample value of a reconstructed pixel comprised in the current block, by using the obtained offsets, wherein a plurality of bands included in the two bandgroups are a part of all bands, wherein each of the two bandgroups has only two adjacent bands among the thirty two bands, wherein sixteen pixel sample values are spanned by each of the two bandgroups, and wherein the two bandgroups, apart from each other, are determined without obtaining, from the bitstream, any piece of information regarding positions of bands which do not have an offset.

4. A video decoding apparatus comprising:
at least one processor configured to:
   obtain, from a bitstream, offsets with respect to bands comprised in each of two bandgroups in thirty two bands with respect to a current block comprised in a video, and obtain, from the bitstream, position information regarding the two bandgroups;
   determine the two bandgroups so as to compensate for a pixel sample value of the current block, based on the position information regarding each of the two bandgroups, wherein the position information comprises only two pieces of information regarding two positions of two start bands in the determined two bandgroups and does not comprise information regarding positions of two last bands in the determined two bandgroups; and
   compensate for a sample value of a reconstructed pixel comprised in the current block, by using the obtained offsets,
wherein a plurality of bands included in the two bandgroups are a part of all bands,
wherein each of the two bandgroups has only two adjacent bands among the thirty two bands,
wherein sixteen pixel sample values are spanned by each of the two bandgroups, and
wherein the two bandgroups, apart from each other, are determined without obtaining, from the bitstream, any piece of information regarding positions of bands which do not have an offset.

* * * * *